United States Patent [19]

Azuma et al.

[11] Patent Number: 4,951,517
[45] Date of Patent: Aug. 28, 1990

[54] ROTATIONAL DRIVING APPARATUS WITH FRICTIONAL ENGAGEMENT AND ROBOT USING THE SAME

[75] Inventors: Yusaku Azuma, Yokohama; Takeo Tanita, Kawasaki; Toshihiro Yamamoto, Yokohama; Shozo Kasai; Masateru Yasuhara, both of Kawasaki; Yasuhiro Sawada, Tokyo, all of Japan

[73] Assignee: Canon Kabushiki Kaisha, Tokyo, Japan

[21] Appl. No.: 262,309

[22] Filed: Oct. 25, 1988

[30] Foreign Application Priority Data

Oct. 28, 1987 [JP] Japan ................................ 62-270236
Sep. 16, 1988 [JP] Japan ........................... 63-120462[U]

[51] Int. Cl.⁵ ....................... F16H 13/14; B25J 18/00; B25J 19/02
[52] U.S. Cl. ........................................ 74/209; 74/206; 414/744.5; 901/9; 901/25
[58] Field of Search ............................ 74/206, 209, 410; 73/517 A; 414/744.2, 744.5; 901/9, 25

[56] References Cited

U.S. PATENT DOCUMENTS

| | | | |
|---|---|---|---|
| 1,591,978 | 7/1926 | Hosking et al. | 74/209 |
| 1,935,355 | 11/1933 | Gaubert | 74/209 X |
| 2,092,714 | 9/1937 | Flygare | 74/206 X |
| 2,731,809 | 1/1956 | Hackney | 74/209 X |
| 4,015,721 | 4/1977 | Scheler | 901/25 X |
| 4,077,266 | 3/1978 | Takamatsu et al. | 73/517 A |
| 4,483,216 | 11/1984 | Takahashi et al. | 74/208 X |
| 4,630,496 | 12/1986 | Hirotoshi | 74/409 |
| 4,738,576 | 4/1988 | Eberle et al. | 901/25 X |

FOREIGN PATENT DOCUMENTS

| 1276655 | 9/1968 | Fed. Rep. of Germany | 74/206 |
| 58-54948 | 7/1983 | Japan. | |

Primary Examiner—Allan D. Herrmann
Attorney, Agent, or Firm—Fitzpatrick, Cella, Harper & Scinto

[57] ABSTRACT

A rotational driving apparatus with frictional engagement includes a base, a rotating member having rigidity and axially supported on the base, at least one frictional roller having rigidity and at least one driving roller which are in rolling contact with the rotating member, a motor for rotating the driving roller, and a pressing mechanism for pressing the frictional and driving rollers against the rotating member, thereby transmitting a driving force of the driving roller to the rotating member to rotate it.

9 Claims, 26 Drawing Sheets

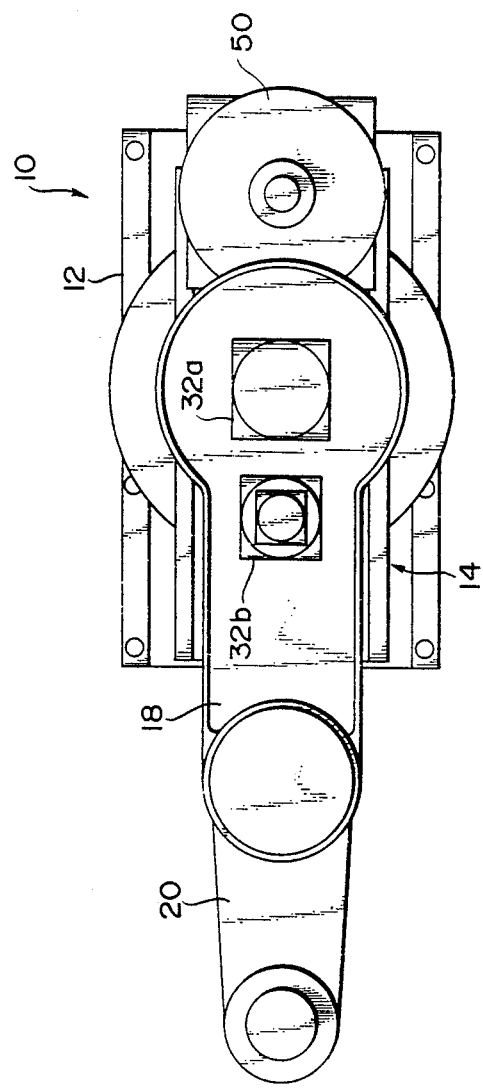
F I G. 2

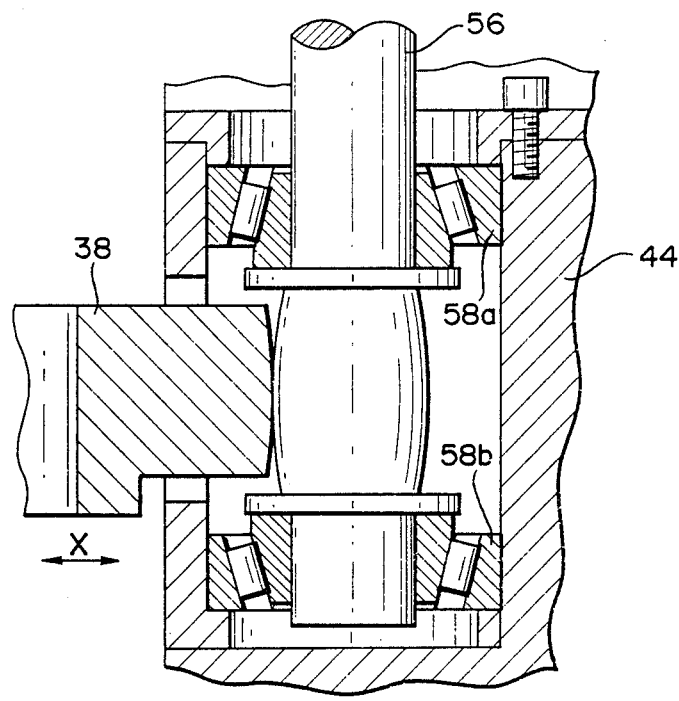
F I G. 8
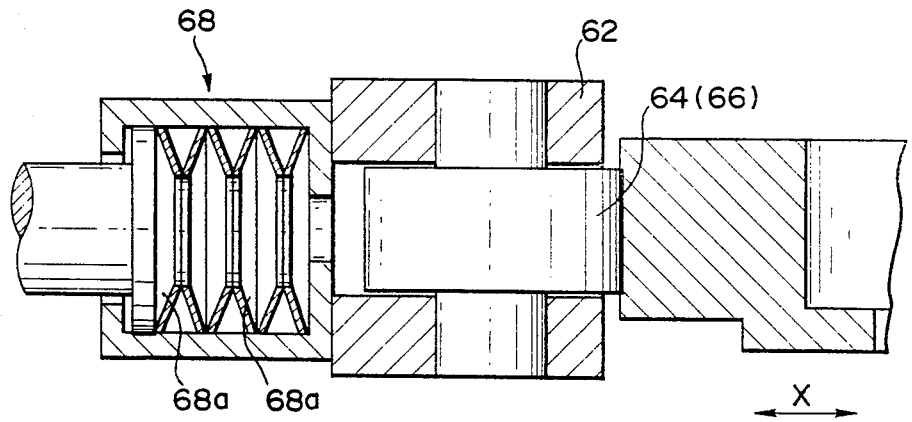
F I G. 9

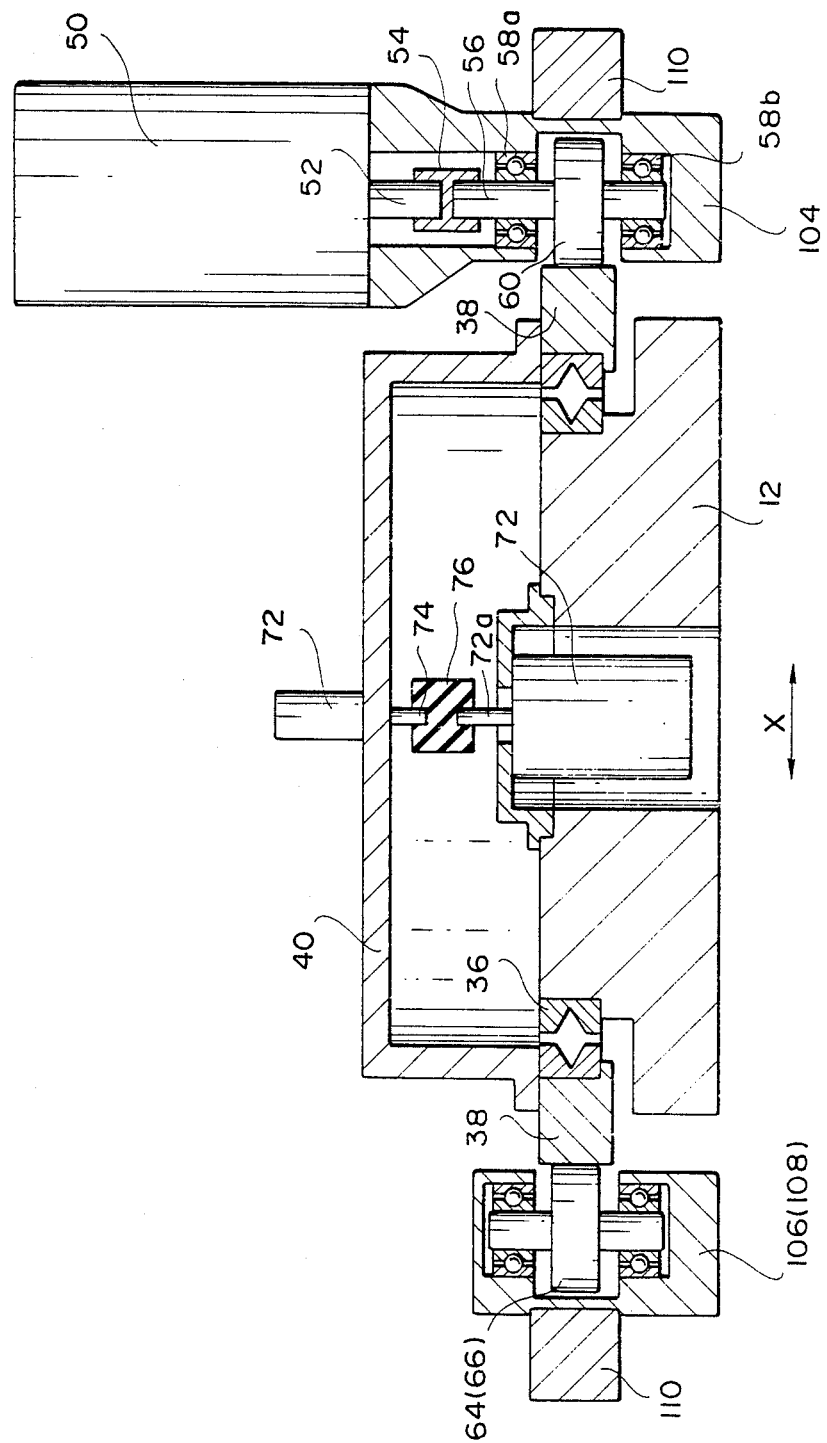
F I G. 15

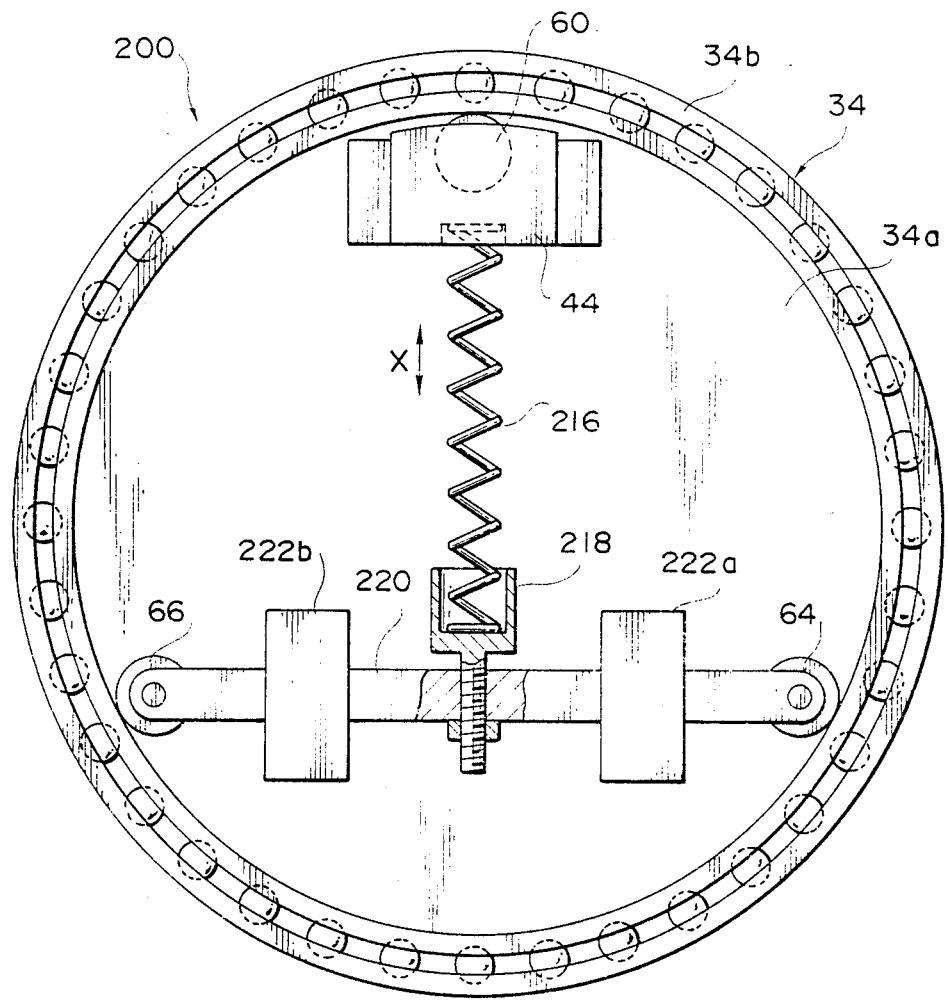
F I G. 22

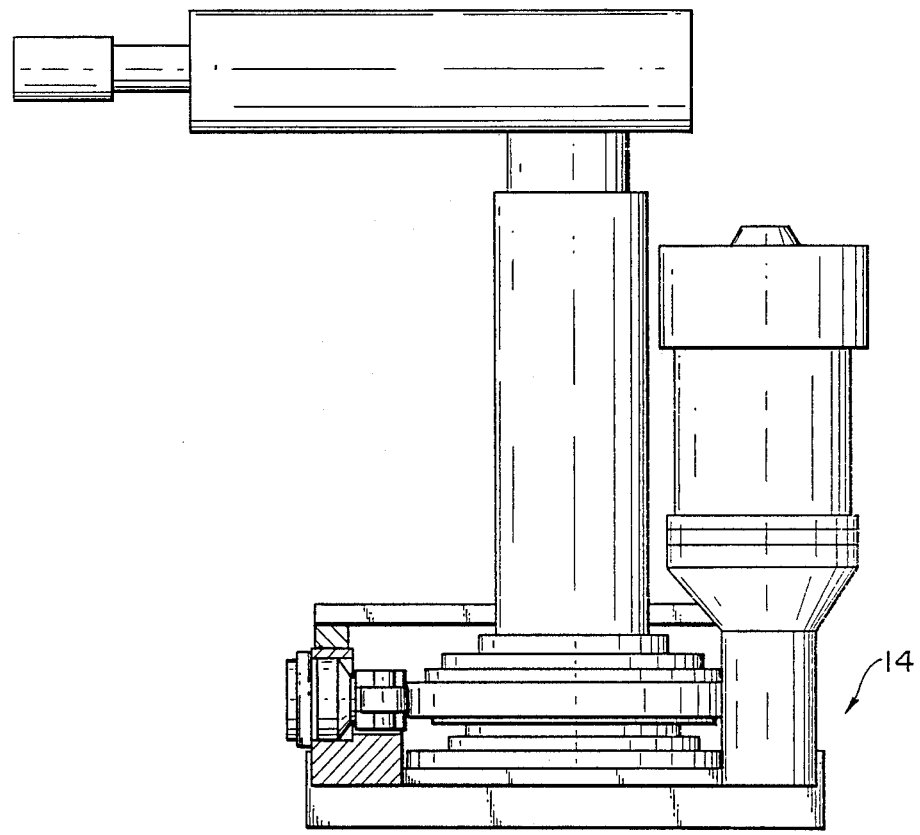
F I G. 29

ROTATIONAL DRIVING APPARATUS WITH FRICTIONAL ENGAGEMENT AND ROBOT USING THE SAME

BACKGROUND OF THE INVENTION

The present invention relates to a rotational driving apparatus with frictional engagement in which at least one frictional roller and a driving roller are pressed against a rotating member so that rotation of the driving roller is transmitted to the rotating member without causing a slip, and to a robot comprising a driving apparatus using the rotational driving apparatus with frictional engagement.

As a conventional rotational driving apparatus used in, e.g., an articulated robot, a technique of transmitting a rotational force from a driving motor through a reduction gear is known, as disclosed in Japanese Patent Laid-Open (Kokai) No. 60-161083 (corresponding to U.S. Pat. No. 4,630,496). However, in the technique of transmitting the driving force through the gear, a backlash inherent to a gear or wear of a gear tooth flank occurs, thus posing problems of rotational positioning precision and durability.

For this reason, as a rotational driving apparatus without a gear, a planet roller type power transmission apparatus for transmitting power by a frictional force of rollers contacting each other is known, as disclosed in, e.g., U.S. Pat. No. 4,483,216. This apparatus has the following construction. That is, a thick portion is formed in an outer circumferential portion to locate a neutral surface near the outer circumference, thereby increasing a deformation property of a contact portion with another roller. Thus, this conventional apparatus accomplishes the object in which a large pressing force is obtained by a small axial urging force. In addition, a mechanical compression means is used without a hydraulic system, thus achieving a simple structure and low cost.

In order to achieve the above object, the conventional planet roller type power transmission apparatus comprises an elastic roller, so that a frictional force is generated between a plurality of planet rollers and a sun roller based on elastic deformation of the elastic roller.

Furthermore, Japanese Patent Publication No. 58-54948 discloses a feeding apparatus in which a plurality of driving rollers are arranged so that frictional surfaces of frictional plates are pressed against a moving member from both sides, and at least one of these driving rollers is coupled to and driven by a driving apparatus.

However, in the conventional planet roller type power transmission apparatus, since a plurality of planet rollers are in rolling contact with a sun roller, if the diameters of the plurality of planet rollers are different from each other, they cannot be essentially in rolling contact with the sun roller. As a result, rotational transmission is unbalanced. The planet rollers having larger diameters are extremely worn. In this manner, the diameters of these planet rollers must have high dimensional precision. As a result, in the planet roller type power transmission apparatus, a problem of an increase in cost is posed.

Since a deformation amount of the elastic roller is very small, if the elastic roller is worn during use for a long period of time, a slip occurs between the elastic roller and the planet rollers. In this case, when a slip occurs between the elastic roller and the planet rollers, a transmission torque is decreased. For this reason, when a slip occurs, an elastic deformation amount of the elastic roller must be adjusted again, thus posing a problem of maintenance. In addition, there is no means for reliably predicting a time of a slip, and the elastic deformation amount must be periodically adjusted, resulting in a cumbersome operation.

A rotational driving apparatus with frictional engagement is suitable for applications in a rotation transmission apparatus of a robot, in particular, a vertical articulated or scalar articulated robot. Such an articulated robot has a large load weight since it is used for gripping and conveying heavy articles. For this reason, in rotational transmission by the elastic roller, the elastic deformation amount of the elastic roller is varied by the load weight. In this manner, when the elastic deformation amount is varied, it is difficult to assure precision of movement control of movable portions in the rotational driving apparatus.

SUMMARY OF THE INVENTION

The present invention has been made in consideration of the above situation, and has as its main object to provide a rotational driving apparatus with frictional engagement in which a rigid driving roller receiving a driving force from driving means and a rigid frictional roller are pressed against a rotating member to frictionally rotate the rotating member without a slip.

The present invention also relates to a holding apparatus for a driving roller and a frictional roller and has as its further object to provide a rotational driving apparatus with frictional engagement which can house a pressing means in a housing for axially supporting the frictional roller, can effectively apply a pressing force of the roller by the pressing means to the rotating member, and can prevent slipping between the driving roller and the rotating member.

The present invention relates to a mode of a pressing means for a driving roller and a frictional roller which are pressed against the rotating member, and has as its still further object to provide a rotational driving apparatus with frictional engagement exemplifying pressing against the outer circumferential surface of the rotating member and pressing against the inner circumferential surface of the rotating member.

It is still further an object of the present invention to provide a robot which transmits a driving force of a driving roller to a rotating member through frictional engagement, so that its joint mechanism is operated upon rotation of the rotating member.

It is still further an object of the present invention to provide a robot which can control rotation of a rotating member to perform movement control of its arm.

It is still further an object of the present invention to provide a robot which can detect a wear amount of a driving roller and can generate an alarm in accordance with a detection output.

To attain the above-mentioned main object, according to one aspect of the present invention, there is provided a rotational driving apparatus with frictional engagement, comprising: a base; a rotating member having rigidity and rotatably supported on the base; at least one frictional roller having rigidity and at least one driving roller which is in rolling contact with the rotating member; driving means for rotating the driving roller; and pressing means for pressing the frictional and driving rollers against the rotating member along a pressing direction, thereby transmitting a driving force of the driving roller to the rotating member to rotate the rotating member.

To attain the above-mentioned further object, according to another aspect of the present invention, there is provided a robot comprising: finger means; a first arm for holding the finger means; and first driving means for driving the first arm, and the first driving means including: a robot base; a rotating member rotatably supported on the robot base and coupled to the first arm; a driving roller which is pressed against the rotating member to rotate the rotating member; at least one frictional roller which is in frictional contact with the rotating member; and control means for controlling a rotational amount of the rotating member to control movement of the first arm.

Even if rolling contact surfaces of the frictional rollers and the rotating member are worn, these frictional rollers are pressed to be in rolling contact with the circumferential surface of the rotating member at a predetermined pressing force by the pressing means. Therefore, only the central distance between each frictional roller and the rotating member is shortened by a wear amount of the frictional roller. Thus, a rolling contact state is not changed, and a rotational force from the driving means can be satisfactorily transmitted to the rotating member.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a top view showing in detail the arrangement of the articulated robot shown in FIG. 1;

FIG. 8 is an enlarged longitudinal sectional view of outer circumferential surface shapes of a driving roller and a rotating member;

FIG. 9 is a longitudinal sectional view showing an arrangement of a spring mechanism;

FIG. 15 is a longitudinal sectional view showing an arrangement of a first modification of the first embodiment of the rotational driving apparatus according to the present invention;

FIG. 22 is a top view showing an arrangement of one modification of the second embodiment;

FIG. 29 is a front view schematically showing an arrangement of a cylinder type articulated robot to which a rotational driving apparatus with frictional engagement according to the present invention is applied.

DETAILED DESCRIPTION OF THE PREFERRED EMBODIMENTS (Description of Arrangement of First Embodiment)

An articulated robot to which an arrangement of a first embodiment of a rotational driving apparatus with frictional engagement according to the present invention is applied will be described in detail with reference to FIGS. 1 to 14.

Figure 1:
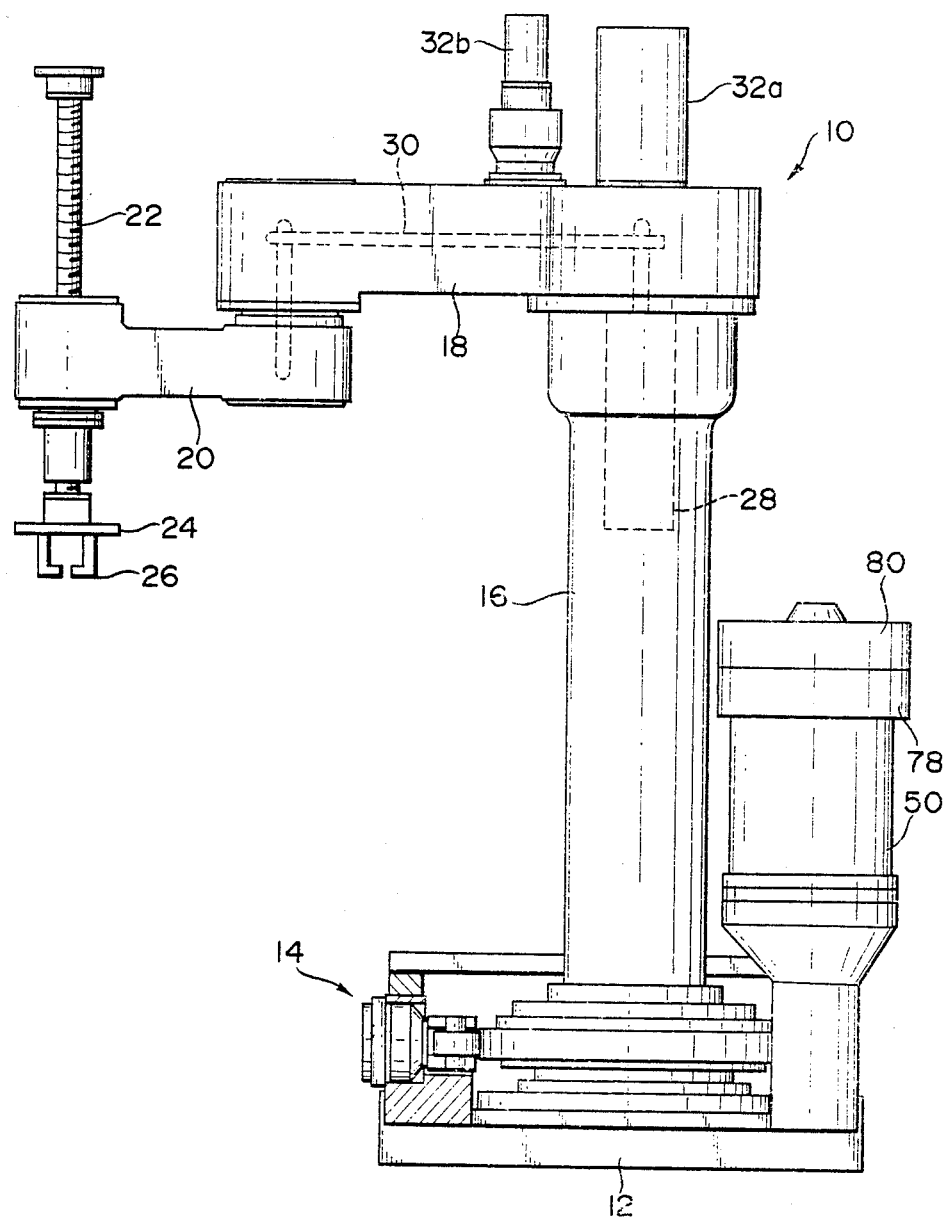
FIG. 1 is a front view schematically showing an arrangement of a scara robot to which a first embodiment of a rotational driving apparatus with frictional engagement according to the present invention is applied.

An articulated robot 10 has a scara structure, as shown in FIGS. 1 and 2, and comprises a base 12 arranged on a foundation (not shown), and an upright shaft portion 16 which is mounted on the base 12 to be rotatable about a vertical axis and is rotated through a rotational driving apparatus 14 with frictional engagement as the characteristic feature of the present invention. The proximal end portion of a first horizontal arm 18 is fixed on the distal end portion of the upright shaft portion 16. The proximal end portion of a second horizontal arm 20 is rotatably mounted on the distal end portion of the first horizontal arm 18. A vertical arm 22 is mounted on the distal end portion of the second horizontal arm 20 to be pivotal about the vertical axis and to be vertically movable along the vertical axis. A finger device 26 is attached to the lower end of the vertical arm 22 through a compliance device 24.

The upright shaft portion 16 is formed of a cylindrical hollow member, and houses a second driving motor 28 therein for rotating the second horizontal arm 20 with respect to the first horizontal arm 18. The first and second horizontal arms 18 and 20 are formed of hollow members. An endless belt 30 for coupling the proximal end portion of the second horizontal arm 20 and the driving shaft of the driving motor 28 is looped to extend through the first horizontal arm 18.

A third driving motor 32a for vertically moving the vertical arm 22 about the vertical axis and a fourth driving motor 32b for rotating the vertical arm 22 are mounted on the upper portion of the upright shaft portion 16. The driving forces of the third and fourth driving motors 32a and 32b are transmitted to the vertical arm 22 through a power transmission mechanism (not shown). The above-mentioned finger apparatus 26 is driven through a driving mechanism (not shown), and grips parts (not shown).

Although not shown, rotary encoders for detecting rotational amounts of the second to fourth motors 28, 32a and 32b, are attached thereto, and are connected to a control unit (to be described later).

The rotational driving apparatus 14, as the characteristic feature of the present invention, for driving the upright shaft portion 16 will be described hereinafter with reference to FIGS. 3 to 9.

Figure 3:
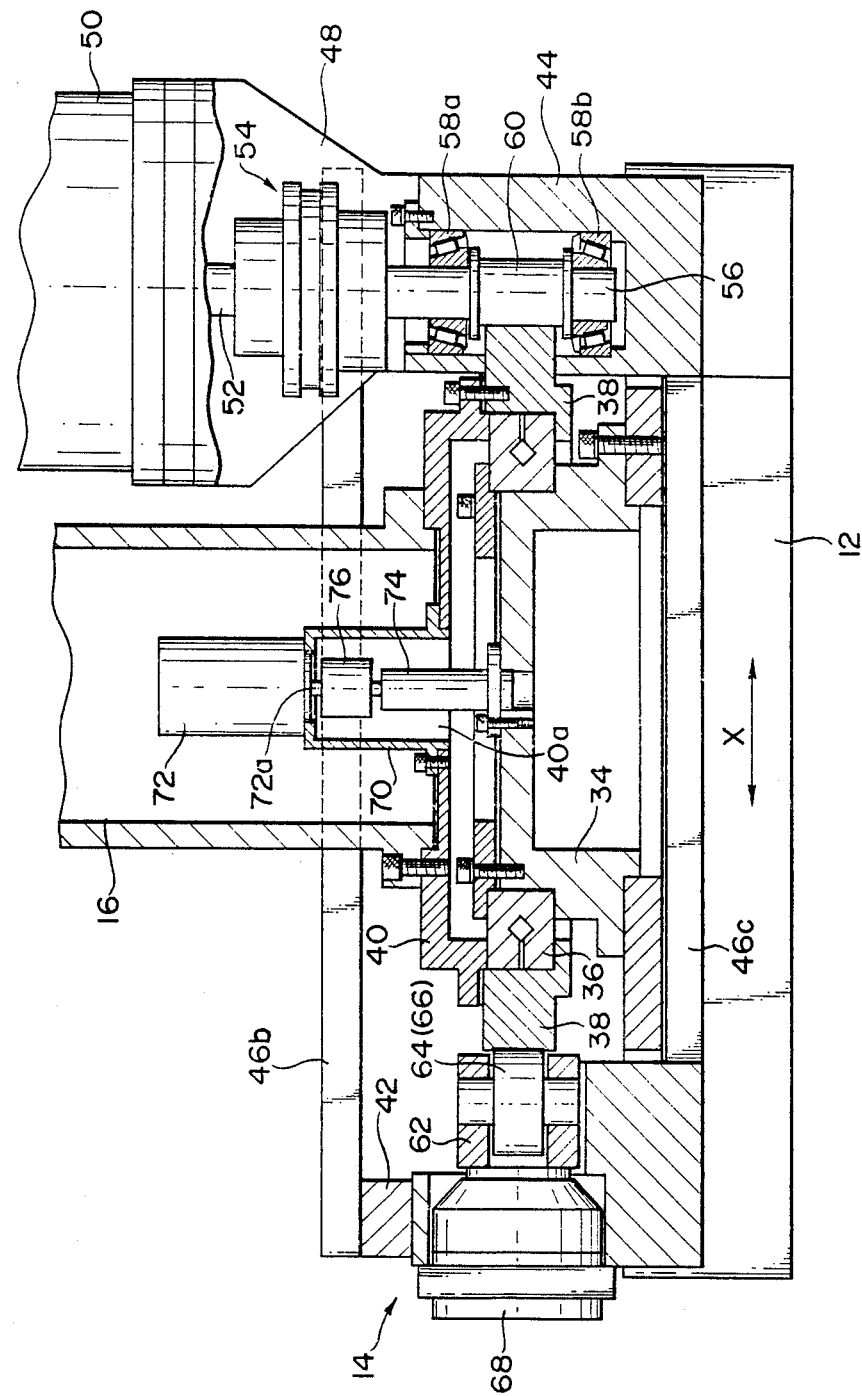
FIG. 3 is a longitudinal sectional view showing an arrangement of a rotational driving apparatus with frictional engagement.

As shown in FIG. 3, the rotational driving apparatus 14 comprises a stepped, cylindrical fixed supporting base 34 fixed on the central portion of the base 12. A ring-shaped rotating member (shown in FIG. 4) 38 is mounted around the upper outer peripheral edge of the fixed supporting base 34 through a cross-roller bearing 36 to be rotatable about the vertical axis. An output flange member 40 is fixed on the upper surface of the rotating member 38. The lower end of the upright shaft portion 16 is connected to the upper surface of the output flange member 40 to be rotated together therewith.

Figure 5:
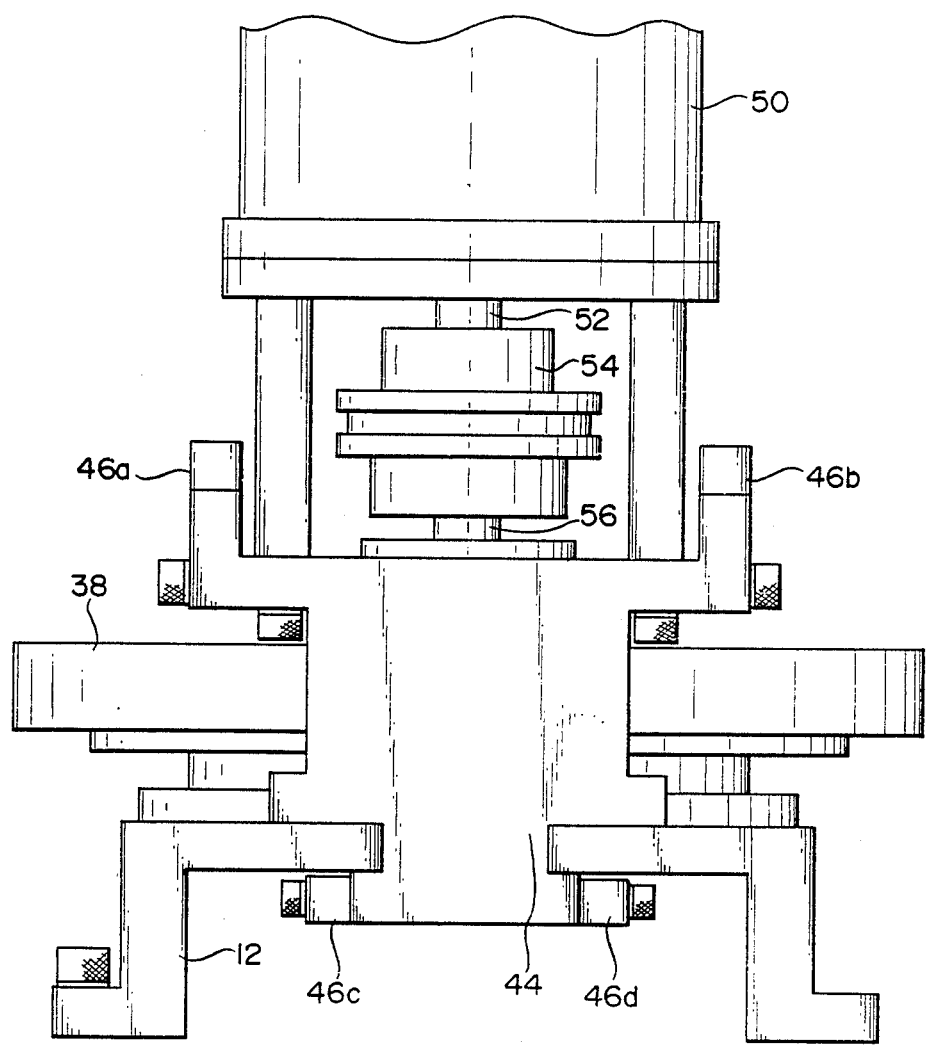
FIGS. 5 and 6 are respectively right and left side views of the rotational driving apparatus shown in FIG. 3.
Figure 6:
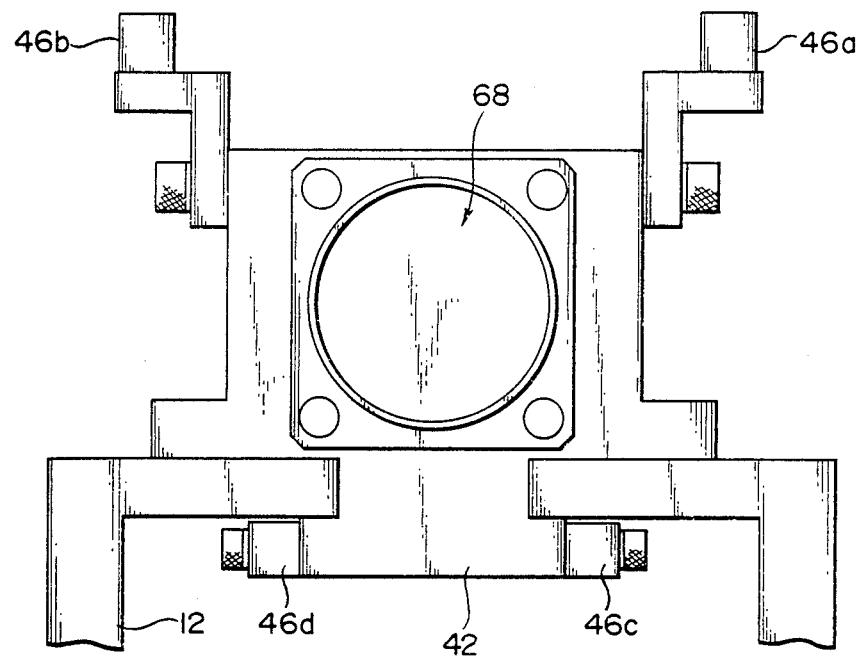
Figure 7:
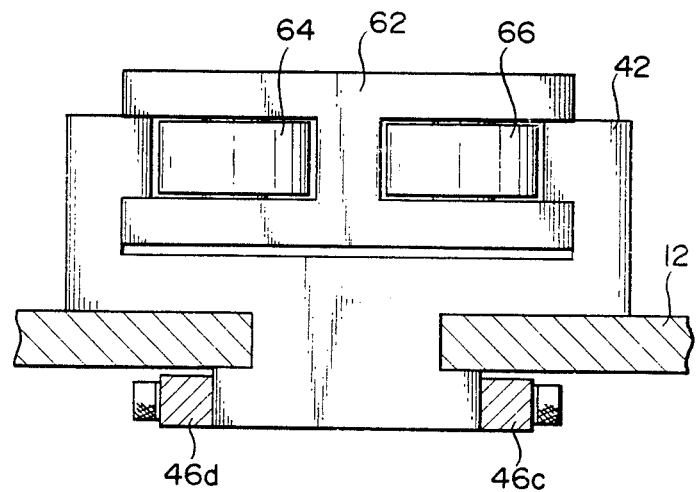
FIG. 7 is a longitudinal sectional view showing the arrangement of the rotational driving apparatus shown in FIG. 3.

The above-mentioned base 12 extends along the extending direction (right-and-left direction as indicated by reference X in FIG. 3) of a predetermined identical diameter of the fixed supporting base 34. A pressing housing 42 and a driving housing 44 are respectively attached to the left and right ends of the base 12 to intermesh with each other so as to be movable in the right-and-left direction in FIG. 3 and not to be disengaged downward from the base 12, as shown in FIGS. 5 and 6. These housings 42 and 44 are coupled to each other through four connecting rods 46a, 46b, 46c, and 46d. In other words, the housings 42 and 44 are connected to be movable together in the right-and-left direction through the four connecting rods 46a to 46d.

The driving housing 44 is formed of a hollow housing having an open side surface opposite to the rotating member 38, and a first driving motor 50 is attached to its upper surface through a mounting stay 48. The first driving motor 50 comprises a motor shaft 52 extending downward which is rotated about the vertical axis. The lower end of the motor shaft 52 is coupled to the upper end of a driving shaft 56 through a coupling joint 54.

The driving shaft 56 is mounted in the driving housing 44 to be rotatable about the vertical axis through a pair of bearings 58a and 58b. The upper end of the driving shaft 56 which extends upward through the driving housing 44 is coupled to the coupling joint 54, as described above. A driving roller 60 which is in rolling contact with the outer circumferential surface of the rotating member 38 is coaxially fixed to that portion of the driving shaft 56 which is sandwiched between the bearings 58a and 58b. In this manner, since the upper end and lower end portions of the driving roller 60 are axially supported by the bearings 58a and 58b, inclination of a rotational axis can be reliably prevented when the driving roller 60 is in rolling contact with the rotating member 38 in a pressed state.

Figure 4:
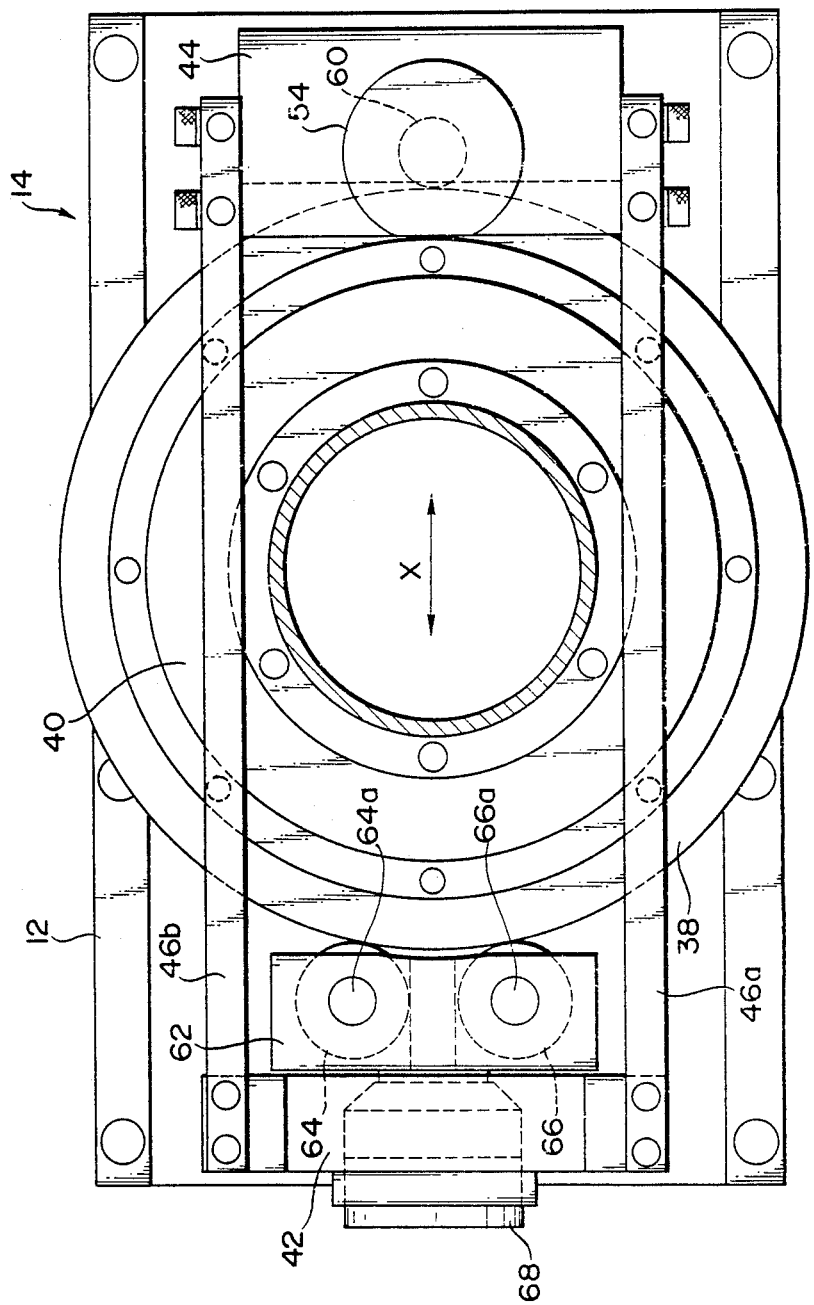
FIG. 4 is a plan view showing the arrangement of the rotational driving apparatus shown in FIG. 3.

The pressing housing 42 is also formed of a hollow housing having an open side surface opposing the rotating member 38. A roller supporting member 62 is disposed in the pressing housing 42 to be slidable along the extending direction X of the above-mentioned predetermined diameter. A pair of pressing rollers 64 and 66 as frictional rollers are supported on the roller supporting member 62 to be separated by an equal distance from a portion therebetween corresponding to the predetermined diameter, respectively, and to be rotatable about the vertical axis through corresponding supporting shafts 64a and 66a, as shown in FIG. 4. These pressing rollers 64 and 66 are disposed to be in rolling contact with the outer circumferential surface of the rotating member 38 described above, as shown in FIG. 4.

In the first embodiment, the rotating member 38, the pressing rollers 64 and 66, and the driving roller 60 are formed of a material having high rigidity such as a metal, and allow frictional rotation against a high pressing force (to be described later). The driving roller 60 and the pressing rollers 64 and 66 as the frictional rollers are formed such that their outer circumferential surfaces are expanded radially outwardly like in a crown shape, as shown in FIG. 8. The outer circumferential surface of the rotating member 38 with which the rollers 60, 64, and 66 are in rolling contact is also formed into a crown shape. In this manner, the rolling contact surfaces of the rollers 60, 64, and 66, and the rotating member 38 are formed into a crown shape. Therefore, even if the rotational axes of the rollers 60, 64, and 66 are inclined (in other words, if the axes are not parallel to each other in a strict sense), the rollers are in point contact with the rotating member near their substantially central portions in the vertical direction. As a result, a contact state can be satisfactorily maintained, and nonsymmetrical wear of the rollers can be prevented, thus prolonging the service life of the rollers.

A spring mechanism 68 is arranged in the pressing housing 42. The spring mechanism 68 biases the roller supporting member 62 toward the rotating member 38 along the extending direction X, so that the pressing rollers 64 and 66 supported thereon are pressed against the outer circumferential surface of the rotating member 38 at a predetermined biasing force. The spring mechanism 68 incorporates a plurality of conical springs 68a which are alternately inverted, as shown in FIG. 9. These conical springs 68a generate biasing forces in accordance with a deviation when they are released from a compressed state.

In this spring mechanism 68, if the deviation amount is changed, the biasing force is only slightly changed. More specifically, the spring mechanism 68 generates a biasing force of 1,000 kg by a deviation of about 6 mm.

As a result, the total length of the spring mechanism 68 is set to be small, and as will be described later, the spring mechanism is insensitive to wear of the driving roller 60, so that the biasing force of the spring mechanism 68 is not essentially changed due to wear.

More specifically, if the biasing force P is set to be 600 kg and wear of 0.2 mm occurs in a driving roller 60 having a diameter of 22 mm, a change ΔP in biasing force caused by the wear of 0.2 mm is given by:

$$\Delta P = 1{,}000 \text{ kg} \div 6 \text{ mm} \times 0.2 \text{ mm}$$
$$= 33 \text{ kg}$$

A change amount of 33 kg is only 5.5% of 600 kg as the original biasing force P, and can be regarded to fall within a range where the biasing force is not essentially changed due to wear.

A through hole 40a is formed at the central portion of the output flange member 40 which is integrally rotated with the rotating member 38. A first rotary encoder 72 for accurately detecting an angular position of the rotating member 38 is attached above the through hole 40a through a mounting stay 70. A fixed shaft 74 for relatively driving a detection terminal 72a of the first rotary encoder 72 is fixed on the central portion of the fixed supporting base 34, i.e., on a portion of the supporting base 34 immediately below the first rotary encoder 72 so as to extend vertically. The upper end of the fixed shaft 74 extends through the through hole 40a described above to a position immediately below the first rotary encoder 72, and is coupled to the lower end of the detection terminal 72a through a coupling joint 76.

In this manner, since the first rotary encoder 72 is arranged, where a driving force of the first driving motor 50 is transmitted to the rotating member 38 through frictional engagement between the driving roller 60 and the rotating member 38, and the rotating member 38 is then rotated, in synchronism with rotation of the rotating member 38, the first rotary encoder 72 is rotated. Since the detection terminal 72a of the first rotary encoder 72 is coupled to the fixed shaft 74, it is rotated relative to the first rotary encoder 72. In this manner, the angular position of the rotating member 38, i.e., the angular position of the upright shaft portion 16 can be accurately detected.

A second rotary encoder 78 and a tachogenerator 80 are attached to the upper end of the motor shaft 52 of the first driving motor 50. The second rotary encoder 78 is arranged to detect a rotational amount of the first driving motor, i.e., a rotational amount or an angular position of the driving roller 60, and the tachogenerator 80 is arranged to detect a rotational speed of the driving roller 60.

Note that the detection results from the first and second rotary encoders 72 and 78 and the tachogenerator 80 are supplied to a control unit (to be described later), and are used for drive control of the robot 10 therein.

A rotational driving operation of the rotational driving apparatus 14 with the above arrangement will be described hereinafter.

In a state wherein the biasing force of the spring mechanism 68 is not set, the pair of pressing rollers 64 and 66 can be brought into contact with or separated from the rotating member 38, and hence, the driving roller 60 is not pressed against the outer circumferential surface of the rotating member 38. The pressing and driving housings 42 and 44 are connected together through the four connecting rods 46a to 46d, and are reciprocal in the direction indicated by the arrow X.

When the biasing force of the spring mechanism 68 is set in the pressing housing 42 from this state, the roller supporting member 62 is deviated toward the rotating member 38 in accordance with the set force. As a result, the pressing rollers 64 and 66 supported on the roller supporting member 62 are pressed against the outer circumferential surface of the rotating member 38 at a predetermined pressing force. The pressing housing 42 is deviated in a direction to be separated from the rotating member 38 by a counterforce of the pressing force.

As a result, the driving housing 44 integrally connected to the pressing housing 42 through the four connecting rods 46a to 46d is deviated in a direction to approach the rotating member 38. The driving roller 60 supported on the driving housing 44 is pressed against the outer circumferential surface of the rotating member 38 at a predetermined pressing force.

In a state wherein the driving roller 60 is pressed against the outer circumferential surface of the rotating member 38 in this manner, they are frictionally engaged, and the rotating member 38 is rotated upon rotation of the driving roller 60. If the pressing force of the driving roller 60 against the rotating member 38 is weak, a slip occurs between the roller 60 and the rotating member 38. For this reason, the biasing force P of the spring mechanism 68 necessary for frictional engagement without causing a slip is determined as follows.

If the rotational force of the rotating member 38 is represented by F, the mass of the rotating member 38 is represented by m, and the angular acceleration of the rotating member 38 is represented by a, the following relation is established:

$$F = m \cdot a$$

If the frictional coefficient between the outer circumferential surfaces of the driving roller 60 and the rotating member 38 is represented by μ, a slip does not occur within a range satisfying the condition of $P > F/\mu = m \cdot a/\mu$. Thus, the driving force of the first driving motor 50 can be effectively transmitted to the rotating member 38.

More specifically, in the first embodiment, the diameter of the driving roller 60 is set to be 22 mm, the rated output of the first driving motor 50 is 450 W, the rated torque is 44 kg·cm, and a peak torque is 132 kg.cm. The frictional coefficient μ is 0.2 since their rolling contact portions are formed of a metal (e.g., stainless steel). As a result, a minimum biasing force necessary for the spring mechanism 68 is 600 kg.

Note that the rotational speed of the rotating member 38 is obtained by multiplying the rotational speed of the first driving motor 50 with a ratio of the diameter of the rotating member 38 to that of the driving roller 60.

In the first embodiment, as described above, the pressing rollers 64 and 66 are pressed against the outer circumferential surface of the rotating member 38 based on the biasing force of the spring mechanism 68, while the driving roller 60 is pressed against the outer circumferential surface of the rotating member 38 by the counterforce of the spring mechanism 68. As a result, the three rollers 60, 64, and 66 are pressed against the outer circumferential surface of the rotating member 38 by the biasing force of the single spring mechanism 68.

Therefore, the pressing forces of these rollers 60, 64, and 66 are well balanced. In a structural sense, since the rotating member 38 is clamped by the frictional rollers at two sides, offsetting of the center of the rotating member 38 can be reliably prevented as compared to a case wherein a frictional roller is in rolling contact with the rotating member from one side, thus achieving a good rotating state.

Since the frictional rollers are used as transmission media of a driving force, a smooth, noiseless driving state can be obtained.

In the rotational driving apparatus 14 using the frictional rollers, the rollers 60, 64, and 66 and the rotating member 38 are worn upon use for a long period of time. In the first embodiment, even when these rollers 60, 64, and 66, and the rotating member 38 are worn, the distances between the centers of the rotating member 38 and the rollers 60, 64, and 66 are decreased for the wear amount. Thus, a pressing force of the driving roller 60 against the rotating member 38 is not essentially changed. In this manner, in the rotational driving apparatus 14 of the first embodiment, a uniform pressing state can be well achieved with a simple structure, and almost no maintenance is required.

As shown in FIG. 3, the shaft portion 16 coupled to the rotating member 38 has a hollow lower portion, and the first rotary encoder 72 and the like as a rotation detection mechanism are disposed in the hollow portion. In this manner, according to the first embodiment, the outer structure of the rotational driving apparatus 14 can be simplified.

Furthermore, the first driving motor 50 for rotating the driving roller 60 is disposed on the driving housing 44 housing the driving roller 60 which is pressed against the rotating member 38. In this manner, even if an arbitrary external force is applied from outside the rotational driving apparatus 14 to the rotating member 38 or the rollers 60, 64, and 66, the coupling joint 54 as a driving force transmission mechanism between the driving roller 60 and the first driving motor 50 does not cause a drive force transmission failure since they are mounted on the single driving housing 44.

(Description of Robot Control in First Embodiment)

The content of driving control of the articulated robot 10 comprising the rotational driving apparatus 14 with the above arrangement will be described in detail hereinafter.

Figure 10:
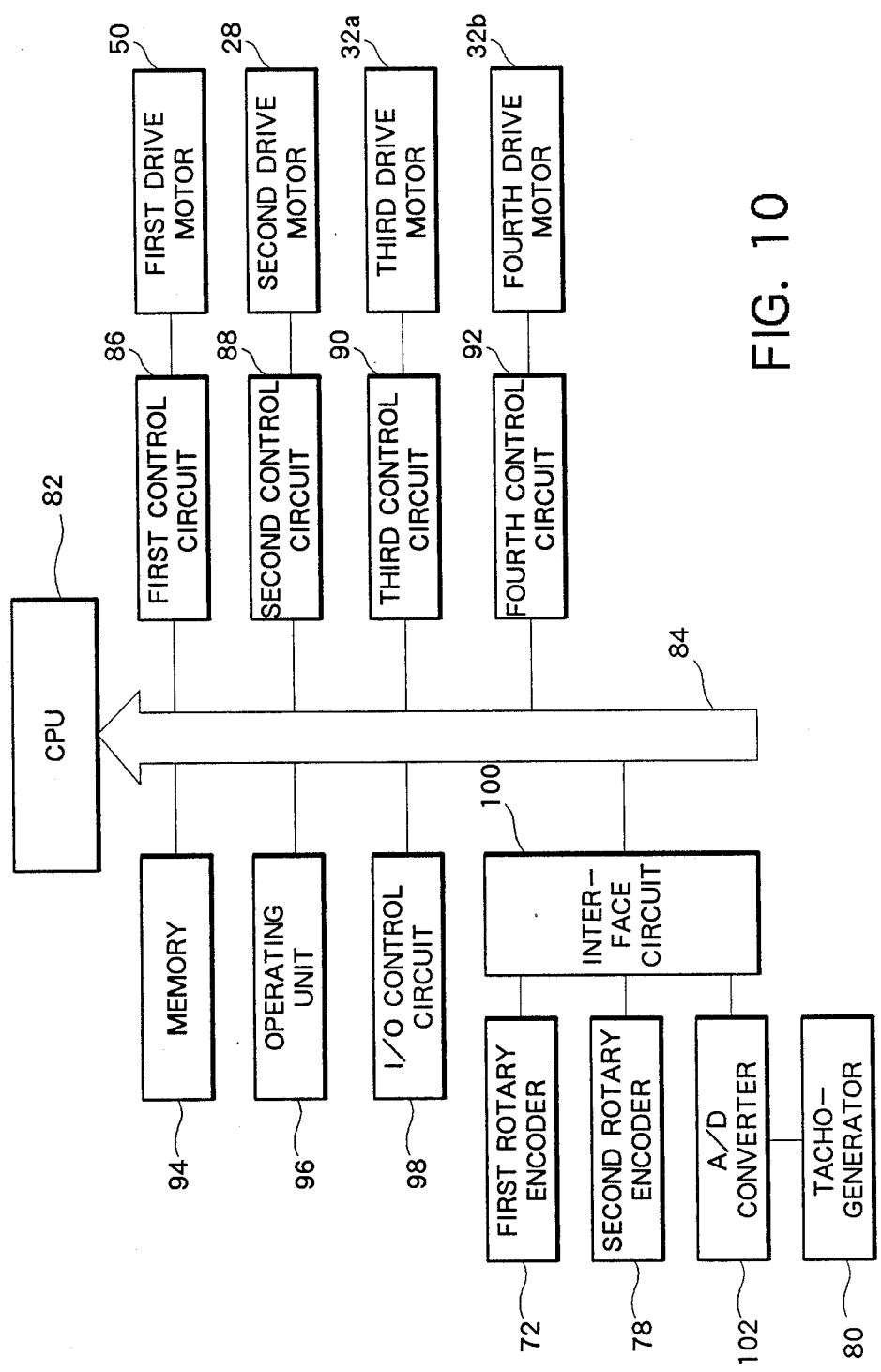
FIG. 10 is a block diagram showing an arrangement of a control system of the robot.

As shown in FIG. 10, a control system of the articulated robot 10 comprises a CPU 82 as a control unit. The CPU 82 is connected, through a bus line 84, to a first controller 86 for controlling rotation of the first horizontal arm 18, a second controller 88 for controlling rotation of the second horizontal arm 20, a third controller 90 for controlling vertical movement of the vertical arm 22, and a fourth controller 92 for controlling rotation of the vertical arm 22. The first controller 86 is connected to the first driving motor 50. The second controller 88 is connected to the second driving motor 28. The third and fourth controllers 90 and 92 are connected to the third and fourth driving motors 32a and 32b, respectively.

The CPU 82 is also connected, through the bus line 84, to a memory 94 as a storage means, an operation unit 96 for instructing a control operation, and an I/O controller 98 for controlling signal inputs/outputs. Furthermore, the CPU 82 is connected to an interface circuit 100 through the bus line 84. The interface circuit 100 is connected to the first and second rotary encoders 72 and 78, and is connected to the tachogenerator 80 through an A/D converter 102.

Figure 11:
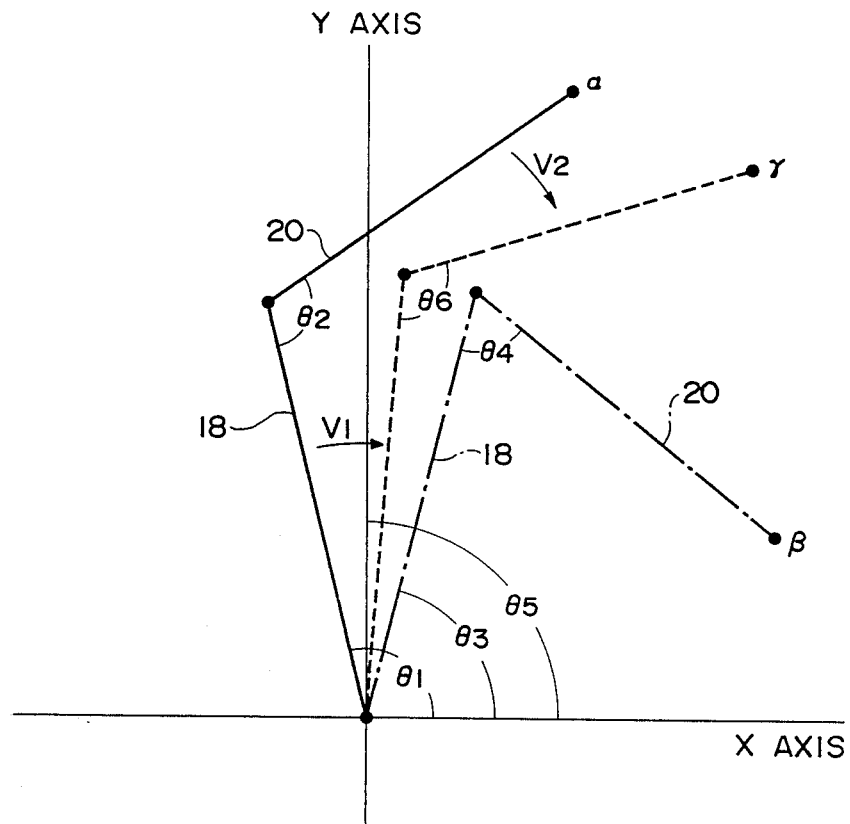
FIG. 11 is a plan view schematically showing angular positions of first and second horizontal arms.
Figure 12:
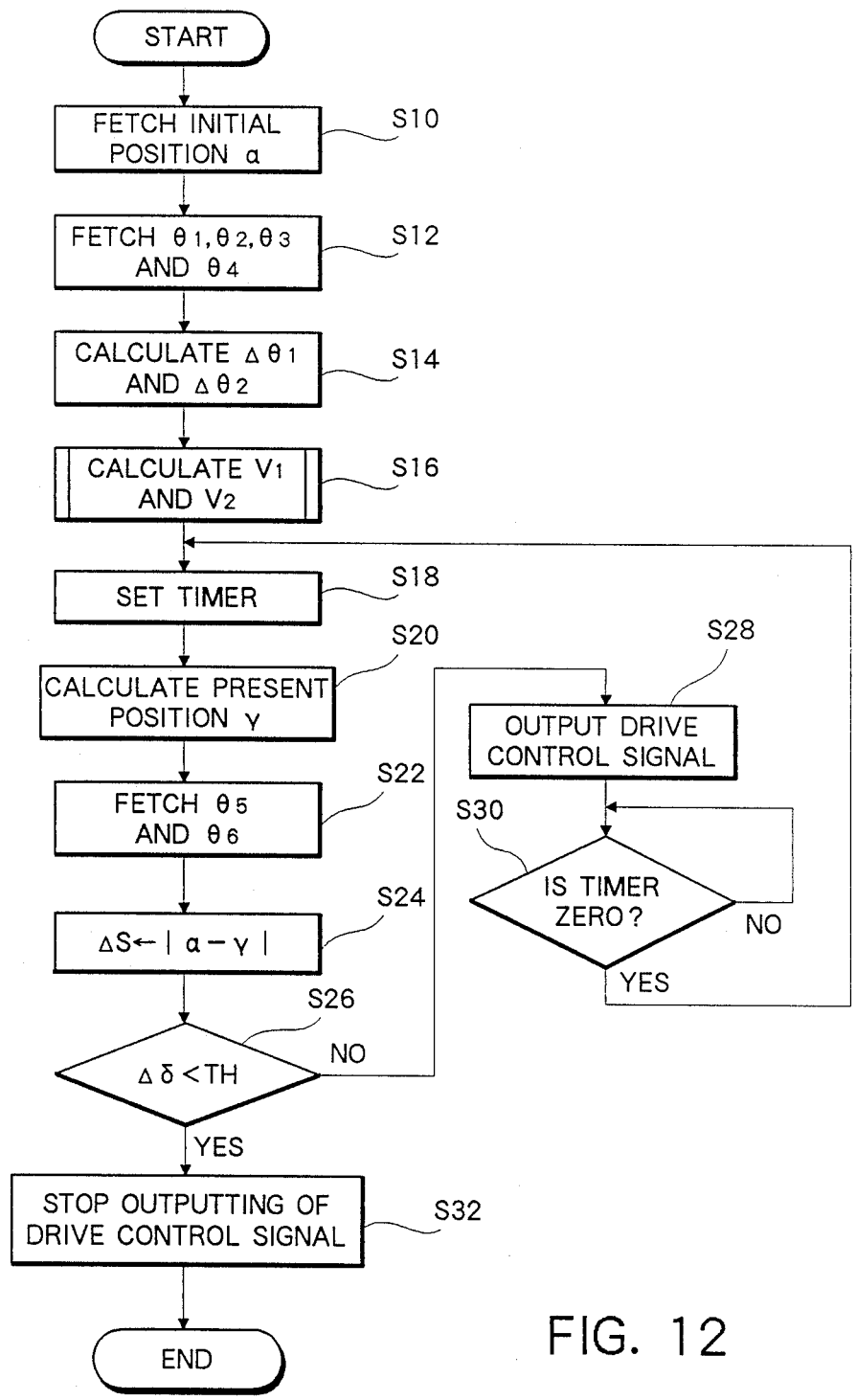
FIG. 12 is a flow chart showing a basic operation control sequence of the robot.
Figure 13:
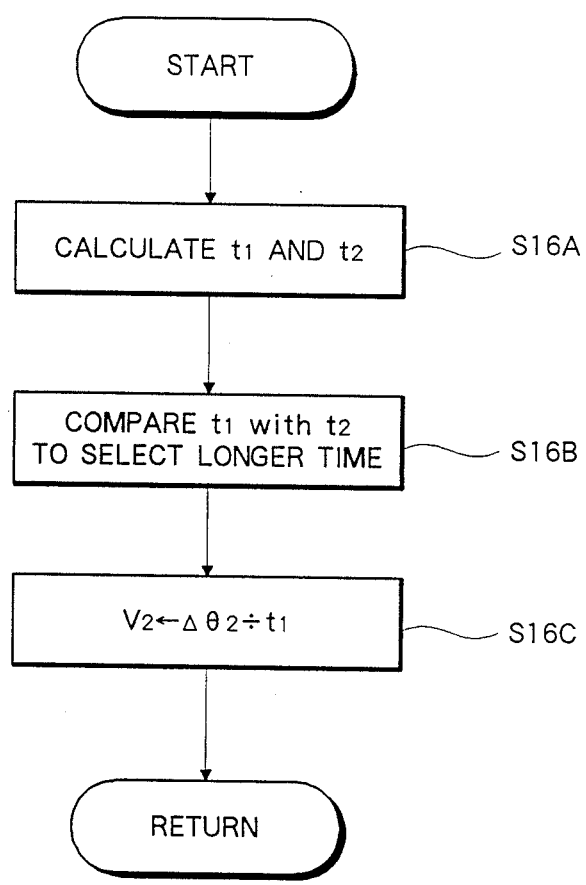
FIG. 13 is a flow chart showing a subroutine for calculating a rotational speed of an arm.

In this control system, for example, when the finger device 26 is moved from an initial position indicated by reference symbol $\alpha$ to a target position indicated by reference symbol $\beta$, as shown in FIG. 11, the control operation is executed in accordance with the flow chart shown in FIG. 12. In a state wherein the finger device 26 is located at the initial position $\alpha$, assume that the x-axis serving as a reference axis and the first horizontal arm 18 form an angle $\theta_1$, and the first and second horizontal arms 18 and 20 form an angle $\theta_2$. In a state wherein the finger device 26 is located at the target position $\beta$, assume that the x-axis and the first horizontal arm 18 form an angle $\theta_3$, and the first and second horizontal arms 18 and 20 form an angle $\theta_4$.

Under these conditions, the control system executes the control operation according to the sequence illustrated in FIG. 12. More specifically, when this control sequence is started, the initial position $\alpha$ and the target position $\beta$ input through the operation unit 96 are fetched in step S10. Thereafter, in step S12, the angle data $\theta_1$, $\theta_2$, $\theta_3$, and $\theta_4$ of the first and second horizontal arms 18 and 20 at the initial position $\alpha$ and the target position $\beta$ are fetched based on the correlation prestored in the memory 94 in accordance with the fetched initial position $\alpha$ and target position $\beta$. In step S14, a necessary moving angle $\Delta\theta_1 (=\theta_1-\theta_3)$ of the first horizontal arm 18 and a necessary moving angle $\Delta\theta_2 (=\theta_2-\theta_4)$ of the second horizontal arm 20 are calculated. Thereafter, based on the calculation results in step S14, the pivoting speeds $v_1$ and $v_2$ of the first and second horizontal arms 18 and 20 are calculated in step S16 as will be described later.

Thereafter, in step S18, 5 msec is set in a timer (down counter). In step S20, the present position $\gamma$ of the finger device 26 is calculated based on the detection results from the first rotary encoder 72 connected to the rotating member 38, and a rotary encoder (not shown) connected to the second driving motor 28. In step S22, angles $\theta_5$ and $\theta_6$ of the first and second horizontal arms 18 and 20 necessary for getting the present position $\gamma$ are fetched through the memory 94 based on the calculated present position $\gamma$.

Note that in the following description, the angles $\theta_5$ and $\theta_6$ are defined as present values, and the angles $\theta_3$ and $\theta_4$ are defined as target values. In this control sequence, when step S20 is executed for the first time, the initial position $\alpha$ coincides with the present position $\gamma$.

Thereafter, a deviation $\Delta S$ is calculated from the absolute value of the difference between the target and present values. It is checked in step S26 if the deviation $\Delta S$ is smaller than a predetermined threshold value TH. If NO in step S26, i.e., if it is determined that the present value does not fall within an allowable range of the target value represented by the threshold value TH, drive control signals are output to the first and second driving motors 50 and 28 based on the pivoting speeds $v_1$ and $v_2$ calculated in step S16, in step S28.

It is checked in step S30 if the content of the timer has reached zero. If NO in step S30, that is, if the content of the timer has not yet reached zero, step S30 is repetitively executed. If YES in step S30, i.e., if the content of the timer has reached zero, the flow advances to step S18, and 5 msec is set in the timer again. Thereafter, the above-mentioned cycle is repeated.

However, if YES in step S26, that is, if the deviation $\Delta S$ is smaller than the threshold value TH and falls within the allowable range of the target value, the flow advances to step S32, and the output of the drive control signals is stopped, thus completing the control sequence.

The control sequence of the control system is executed as described above. A subroutine associated with calculations of the pivoting speeds $v_1$ and $v_2$ of the first and second horizontal arms 18 and 20 in step S16 will be explained below with reference to the flow chart shown in FIG. 13. The pivoting speeds $v_1$ and $v_2$ are calculated such that the first and second horizontal arms 18 and 20 complete their operations at the same time within a short period of time.

When step S16 is started, in step S16A, times $t_1$ and $t_2$ required for pivotal movement are calculated based on the necessary moving angle $\Delta\theta_1$ ($=\theta_1-\theta_3$) of the first horizontal arm 18 and the necessary moving angle $\Delta\theta_2$ ($=\theta_2-\theta_4$) of the second horizontal arm 20 calculated in step S14 described above, and a maximum rotational speed obtained in advance from the first and second driving motors 50 and 28. In step S16B, the times $t_1$ and $t_2$ required for pivotal movement are compared, and a longer time of the two times is selected. For the sake of descriptive simplicity, assume that $t_1 > t_2$. As a result, the time $t_1$ is a longer one. Thus, a shortest moving time from the initial position $\alpha$ to the target position $\beta$ in the robot 10 is defined by the time $t_1$ of the first horizontal arm 18.

For this reason, in step S16C, the pivoting speed $v_2$ ($=\Delta\theta_2 \mp t_1$) of the second driving motor 28 is calculated so that the time required for pivoting the second horizontal arm 20 is set to be the time $t_1$ of the first horizontal arm 18. In this manner, this subroutine is ended, and control returns to the main control sequence.

The robot 10 is driving-controlled by the above-mentioned control content. In this robot 10, as described above, even if the driving roller 60 is worn, a rolling contact state between the driving roller 60 and the rotating member 38 can be satisfactorily maintained. However, if the wear amount of the driving roller 60 becomes too large, the maximum rotational speed of the rotational member 38 is decreased, and desired performance cannot be obtained. For this reason, in the first embodiment, a detection control operation of a wear amount is executed by an interrupt routine started every morning when power-on of the robot 10 is instructed independently of the control sequence described with reference to FIG. 12.

Figure 14:
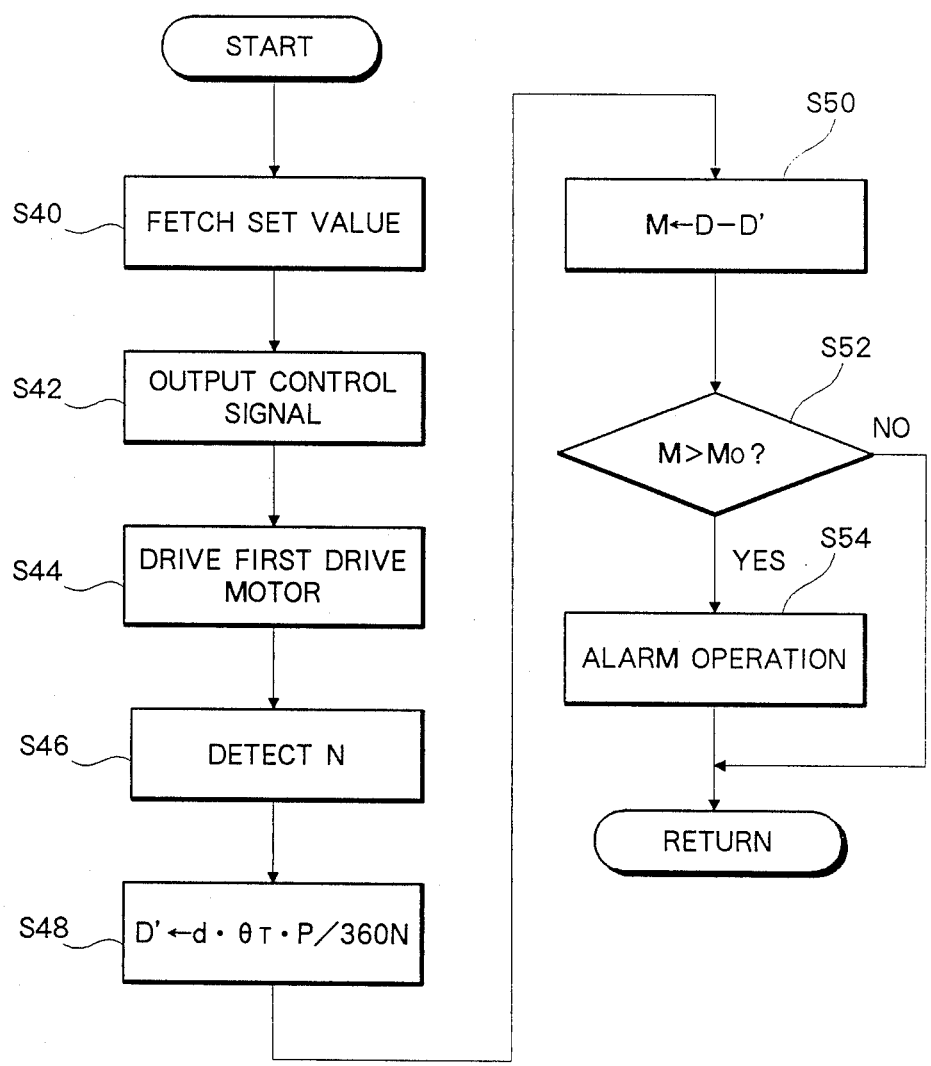
FIG. 14 is a flow chart for detecting a wear amount of the driving roller.

The interrupt routine for detecting the wear amount will be explained with reference to FIG. 14.

When a predetermined interrupt timing comes, in step S40, a rotational speed $v_T$ of a test run rotating member 38, a pivot angle $\theta_T$ of the rotating member 38, a diameter (initial value) D of the driving roller 60, a diameter d of the rotating member 38, and a pulse count P output from the second rotary encoder 78 output per rotation of the driving roller 60 are fetched as constants. The rotational speed $v_T$ is set to be a small value so as not to cause a slip between the driving roller 60 and the rotating member 38 which are in rolling contact with each other.

In step S42, a control signal is supplied to the first controller 86 so that the rotating member 38 is pivoted at the rotational speed $v_T$ through the angle $\theta_T$. In step S44, the first driving motor 50 rotates the driving roller 60 based on this control signal, so that the rotating member 38 is rotated through the angle $\theta_T$ and is stopped.

Thereafter, in step S46, in order to numerically detect a pivoting amount of the rotating member 38 from start of rotation to stop, a pulse count N output from the first rotary encoder 72 is detected. In step S48, an actual (present) diameter D' of the rotating member 38 is calculated from the following equation based on the pulse count N detected upon rotation of the rotating member 38. Normally, both the rotating member 38 and the driving roller 60 are worn. However, since the diameter of the rotating member 38 is sufficiently larger than that of the driving roller 60, the wear amount of the rotating member 38 is assumed to be negligible. Under this assumption, and as described above, if a slip does not occur between the rotating member 38 and the driving roller 60, their pivoting distances are equal to each other. Thus, the following relation is established:

$$d\pi \times \theta_T/360 = D'\pi \times N/P$$

From this equation, D' is given by:

$$D' = d\theta_T P/360N$$

As described above, since d, $\theta_T$ and P are predetermined constants, and N is the detection value, D' can be uniquely determined.

In step S50, the difference between the actual diameter D' and the initial diameter D of the driving roller 60, i.e., a wear amount M is calculated. Thereafter, it is checked in step S52 if the calculated wear amount M is larger than a preset allowance $M_0$.

If NO in step S52, i.e., if the calculated wear amount M is smaller than the allowance $M_0$, it is determined that there is no problem if this driving roller 60 is used. Therefore, this detection sequence is completed, and control returns. On the other hand, if YES in step S52, i.e., if the calculated wear amount M is larger than the allowance $M_0$, the flow advances to step S54, and an alarm operation is executed, thus urging an operator to replace the driving roller 60. Then, control returns.

In this manner, the wear amount M of the driving roller 60 can be numerically detected. When the wear amount M exceeds the allowance $M_0$, the driving roller 60 can be replaced. Thus, the maximum speed of the first horizontal arm 18 can be satisfactorily maintained at a desired value.

The present invention is not limited to the arrangement of the first embodiment, and various changes and modifications may be made within the spirit and scope of the invention.

(Description of First Modification of First Embodiment)

For example, in the first embodiment described above, the three frictional rollers are divided to one and two rollers and are disposed at substantially two ends of the predetermined diameter of the rotating member 38, and the pressing and driving housings 42 and 44 for rotatably supporting these rollers are provided. These housings 42 and 44 are coupled together through the four coupling rods 46a to 46d, while the spring mechanism 68 housed in the pressing housing 42 is arranged as a pressing means.

Figure 16:
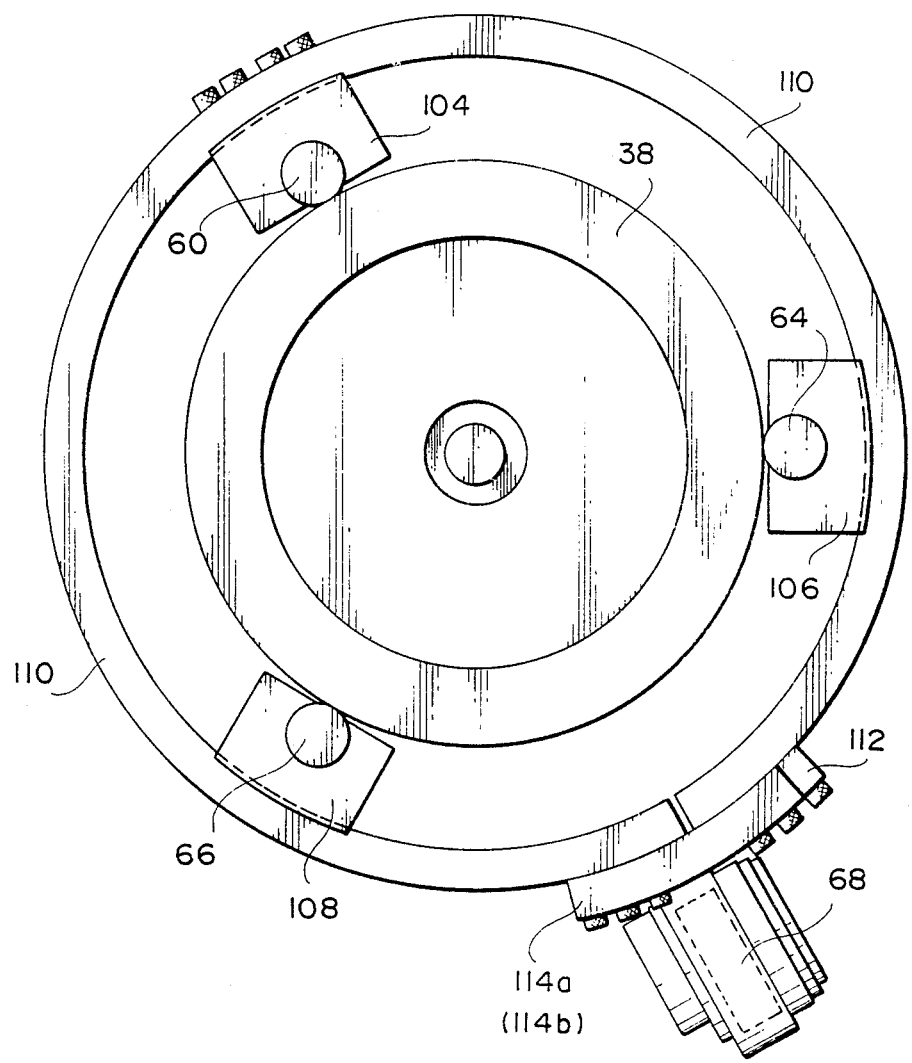
FIG. 16 is a plan view showing the arrangement of the rotational driving apparatus shown in FIG. 15.

However, the present invention is not limited to the above arrangement, and, may be arranged like in a first modification as shown in FIGS. 15 and 16.

In the following descriptions of various embodiments and modifications, the same reference numerals denote the same parts as in the first embodiment described above, and a detailed description thereof will be omitted.

In the rotational driving apparatus 14 according to the first modification of the first embodiment, three frictional rollers 60, 64, and 66 are disposed at equal angular intervals, i.e., 120° while they are in rolling contact with the outer circumferential surface of the rotating member 38, as shown in FIG. 16. These frictional rollers 60, 64, and 66 are supported on corresponding supporting housings 104, 106, and 108 to be pivotal about the vertical axis through rotational shafts 56, 64a, and 66a, respectively.

The rotational shaft 56 of the frictional roller 60 located at the highest position in FIG. 16 extends upward through the upper surface of the supporting housing 104, as shown in FIG. 15. The upper end of the rotational shaft 56 is coupled to the motor shaft 52 of the first driving motor 50 through the coupling joint 54 in the same manner as in the first embodiment.

The three supporting housings 104, 106, and 108 are fixed to a C-shaped connecting segment 110, as shown in FIG. 16. More specifically, the C-shaped connecting segment 110 is loosely fit on the outer periphery of the rotating member 38. The central portion of the segment 110 is fixed to the outer side surface of the supporting housing 104 for rotatably supporting the driving roller, and its portions near the both ends are fixed to the outer side surfaces of the supporting housings 106 and 108 for pivotally supporting the pressing rollers 64 and 66, respectively.

Both end portions of the connecting segment 110 are separated at a given interval to oppose each other. A mounting segment 112 is fixed integrally with one end portion. The other end portion is branched into two portions to clamp the mounting segment 112 from both sides, and bent portions 114a and 114b are integrally formed on the branched portions.

More specifically, these bent portions 114a and 114b are interdigitally overlaid on the mounting segment 112. In this manner, the same spring mechanism 68 as in the first embodiment described above is disposed between the opposing bent portions 114a and 114b and the mounting segment 112, and biases both end portions of the connecting segment 110 toward each other.

Since the spring mechanism 68 is disposed in this manner, substantially the C-shaped connecting segment 110 is biased to decrease its diameter based on the biasing force of the spring mechanism 68. When the diameter of the connecting segment 110 is decreased, the three frictional rollers 60, 64, and 66 are in rolling contact with the outer circumferential surface of the rotating member 38 while being pressed thereagainst at a predetermined biasing force.

In this manner, according to the first modification, although its arrangement is slightly different from that of the first embodiment, the same function and effect as in the first embodiment can be obtained.

(Description of Second Modification of First Embodiment)

Figure 17:
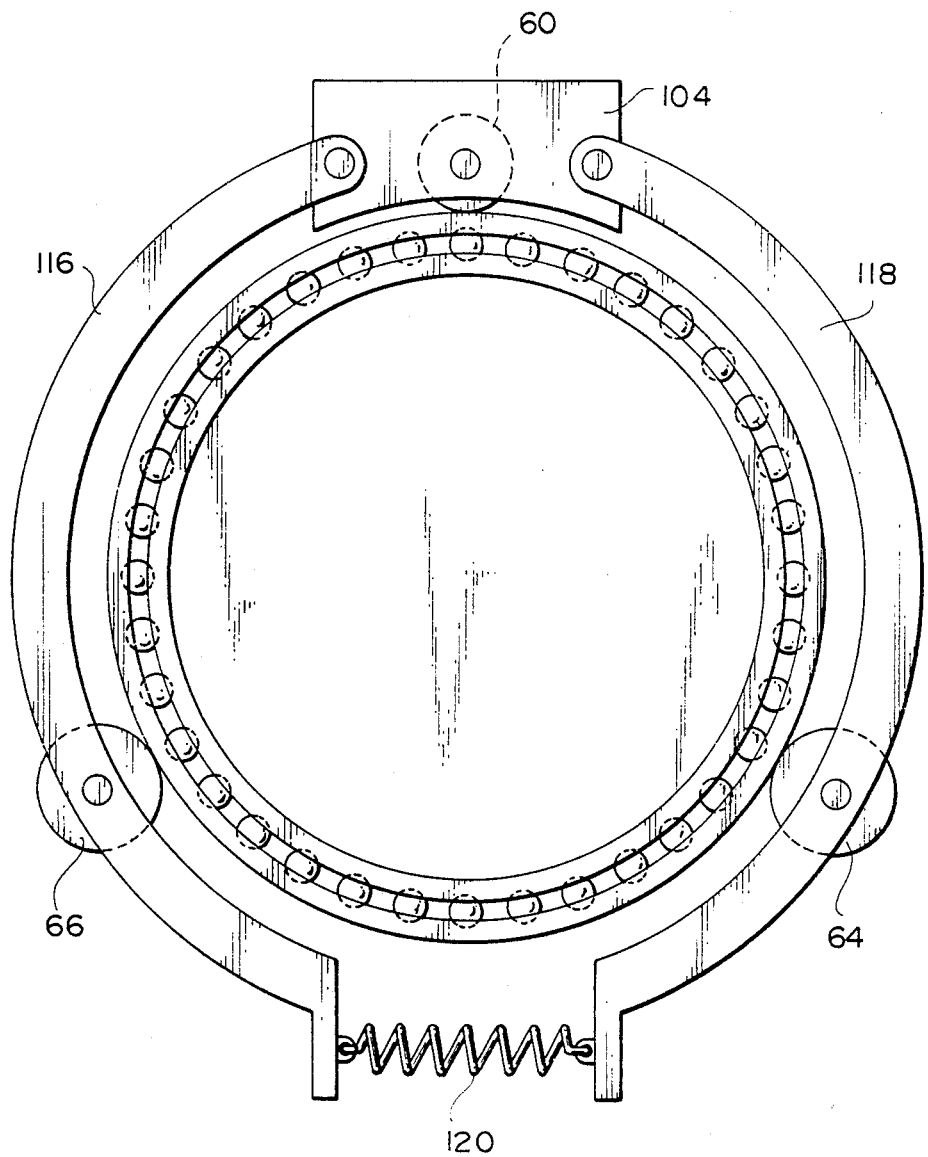
FIG. 17 is a top view schematically showing an arrangement of a second modification of the first embodiment.

In the first modification, the C-shaped connecting segment is used as a connecting means. The connecting means may be arranged as in the second modification of the first embodiment illustrated in FIG. 17.

More specifically, the connecting means of the second embodiment is constituted by a pair of arcuated connecting segments 116 and 118. First ends of the connecting segments 116 and 118 are pivotally mounted on both sides of the supporting housing 104 on which the frictional roller 60 as the driving roller is pivotally supported. The other ends of the segments 116 and 118 oppose each other to be separated at a given interval on the outer periphery of the rotating member 38 located at a side opposite to the side of the supporting housing 104.

The other end portions of the connecting segments 116 and 118 are bent radially outwardly, and a tension coil spring 120 serving as a pressing means is interposed between the other end portions. Two frictional rollers 64 and 66 serving as the pressing rollers are directly axially supported on the middle portions of the connecting segments 116 and 118, respectively.

Since the second modification is arranged as described above, the same function and effect as in the first embodiment can be provided.

(Description of Third Modification of First Embodiment)

Figure 18:
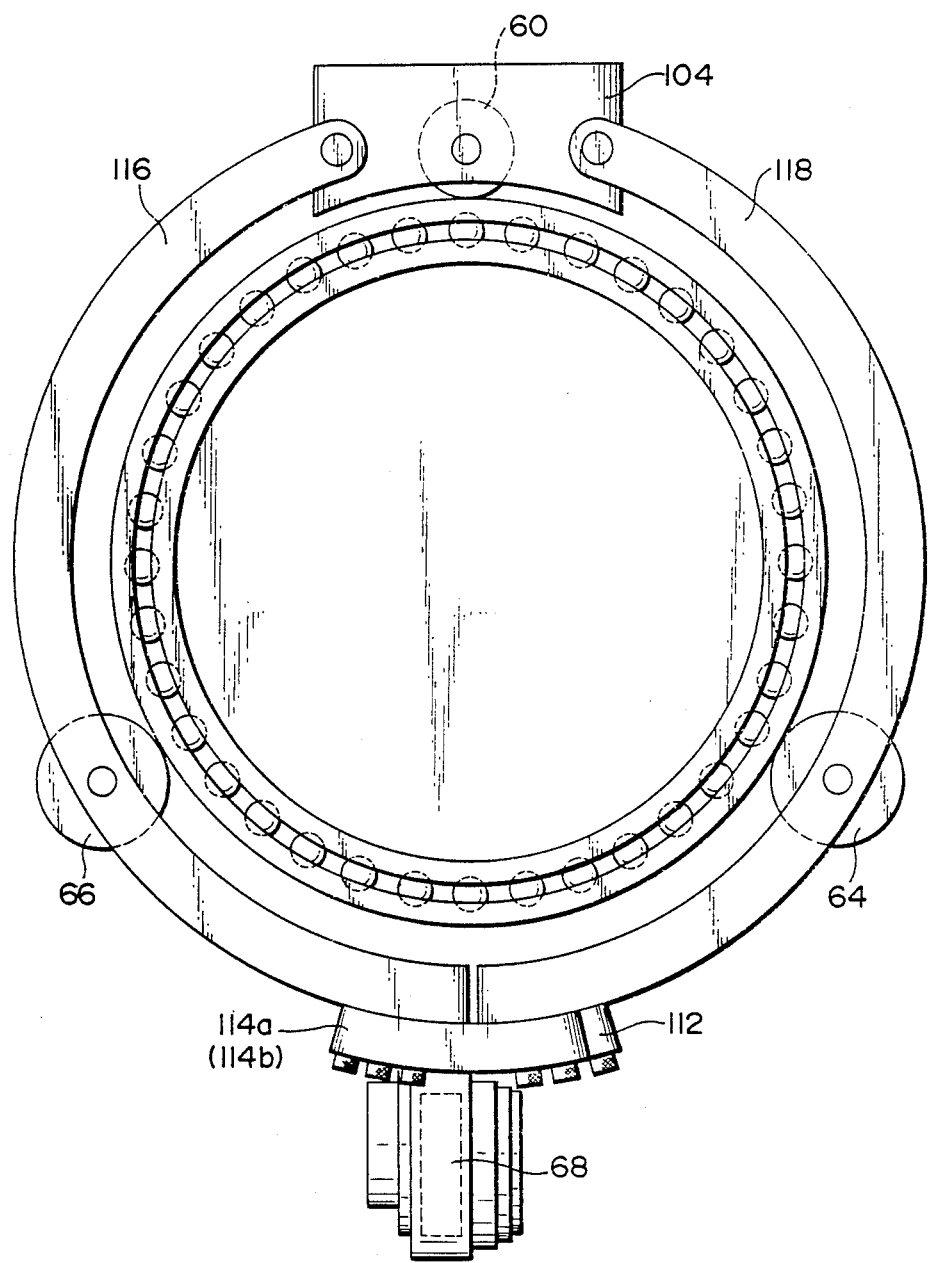
FIG. 18 is a top view showing a mounting mechanism of a spring mechanism according to a third modification of the first embodiment.

In the second modification, the other end portions of the connecting segments 116 and 118 are separated from each other. However, the present invention is not limited to this. As shown in the third modification of FIG. 18, the other end portions may be interdigitally arranged as in the second modification, and the spring mechanism 68 may be disposed therebetween. In this case, a spring used in the spring mechanism 68 is set to provide a biasing force as a so-called compression spring contrary to the case of the first modification.

Since the third modification is arranged as described above, the same function and effect as in the first embodiment can be provided.

(Description of Second Embodiment)

In the first embodiment and the first to third modifications, the three frictional rollers are frictionally engaged with the outer circumferential surface of the rotating member 38. However, these rollers may be frictionally engaged with the inner circumferential surface of the rotating member 38 as shown in a second embodiment shown in FIGS. 19 to 21.

More specifically, in a rotational driving apparatus 200 with frictional engagement according to the second embodiment, a fixed supporting base 34 is formed into a cylindrical shape with a bottom constituted by a disk-like body 34a and a cylindrical circumferential wall portion 34b integrally formed to stand upright on the outer periphery of the body 34a. A radial bearing 202 is mounted on the inner circumferential surface of the upper portion of the circumferential wall portion 34b of the fixed supporting base 34. An outer race 202a of the radial bearing 202 is fixed to the inner circumferential surface of the circumferential wall 34b, and an inner race 202b is fixed to the rotating member 38.

Figure 19:
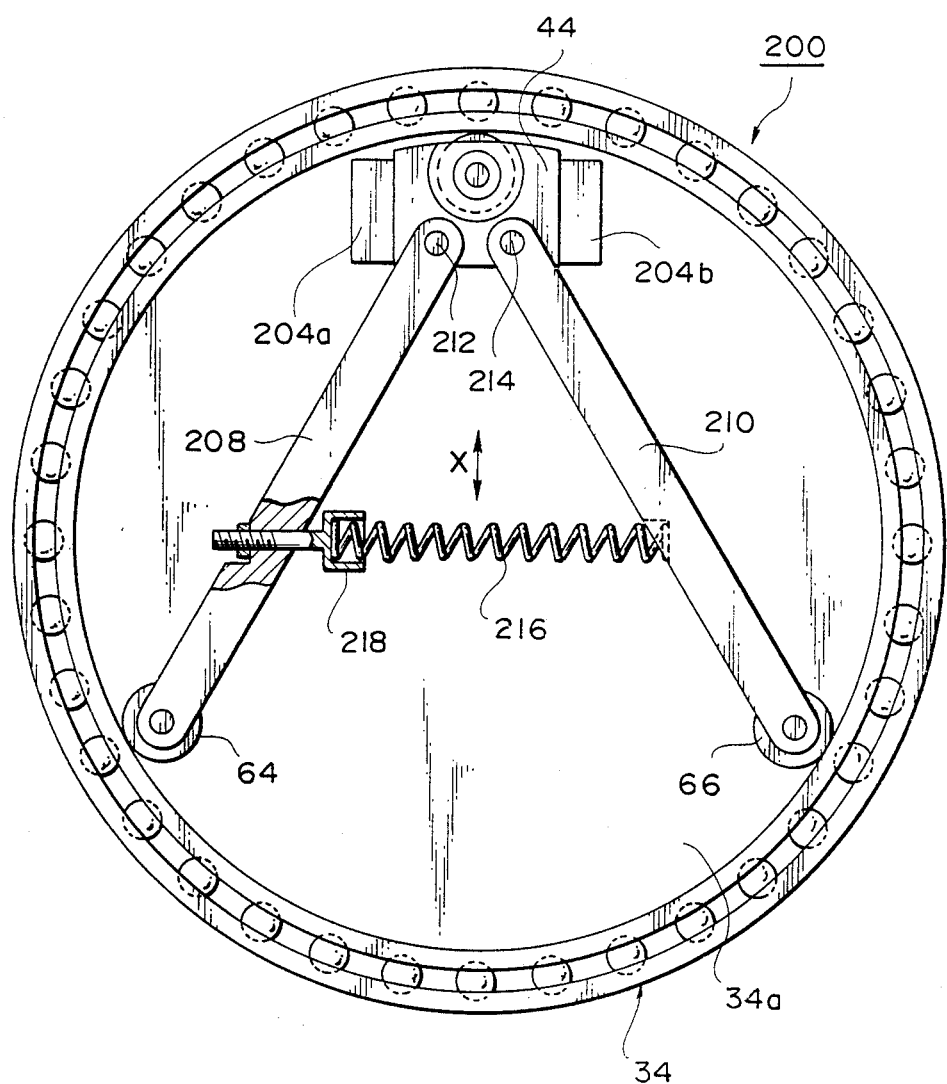
FIG. 19 is a longitudinal sectional view showing an arrangement of a second embodiment of a rotational driving apparatus with frictional engagement according to the present invention.

As shown in FIG. 19, a driving housing 44 for rotatably supporting the driving roller 60 is disposed inside the rotating member 38. Both sides of the driving housing 44 are clamped and regulated by guide members 204a and 204b, as shown in FIG. 21, so that the housing 44 can be moved along only the right-and-left direction of FIG. 20 as indicated by the arrow X along a predetermined diameter.

Figure 20:
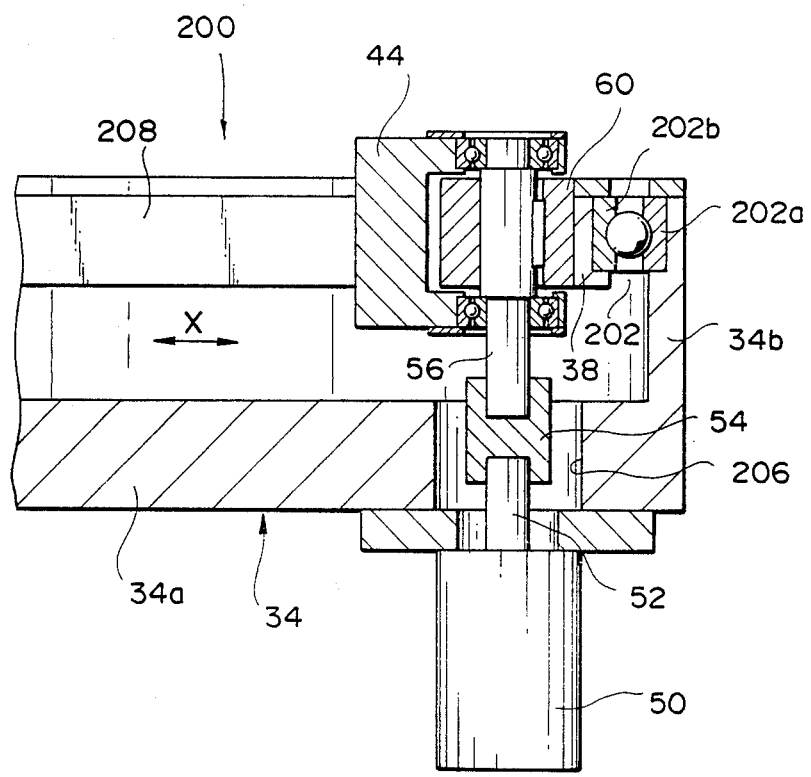
FIG. 20 is a longitudinal sectional view showing the arrangement of the rotational driving apparatus shown in FIG. 19.
Figure 21:
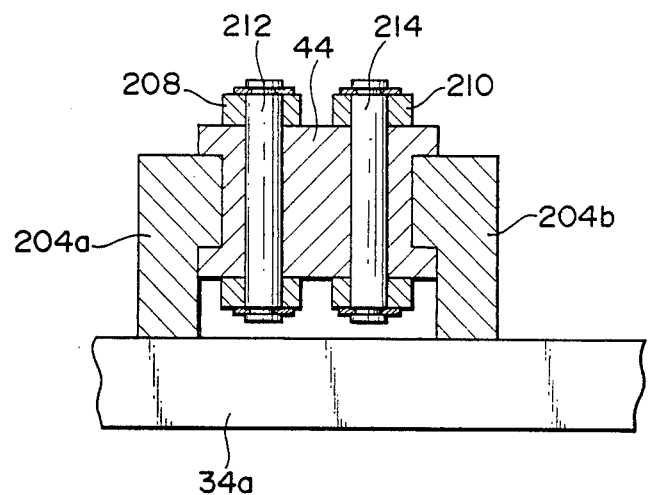
FIG. 21 is a longitudinal sectional view showing the arrangement of the rotational driving apparatus shown in FIG. 19.

In the second embodiment, as shown in FIG. 20, a driving shaft 56 extends downward from the driving housing 44. An elongated hole 206 vertically extends through a portion of the body 34a of the fixed supporting base 34 located immediately below the driving roller 60. The elongated hole 206 extends along the direction indicated by the arrow X described above. A first driving motor 50 is mounted on the lower surface of the body 34a so that its motor shaft 52 extends downward from the elongated hole 206. The motor shaft 52 and the driving shaft 56 are coupled through a coupling joint 54 to be rotated together.

One end portions of a pair of connecting rods 208 and 210 are supported on the driving housing 44 to be pivotal about the vertical axis through supporting shafts 212 and 214, as shown in FIG. 19. Pressing rollers 64 and 66 as the frictional rollers are rotatably supported on the other end portions of these connecting rods 208 and 210. The lengths of these connecting rods 208 and 210 are set such that a total of three, i.e., the driving roller 60 and the pressing rollers 64 and 66 are in rolling contact with the inner circumferential surface of the inner race 202b of the radial bearing 202 while they are disposed at equal angular intervals.

A compression coil spring 216 as a pressing means is interposed between the middle portions of the connecting rods 208 and 210. The compression coil spring 216 biases the connecting rods 208 and 210 to be separated from each other, i.e., so that the rollers 60, 64, and 66 are pressed against the inner circumferential surface of the inner race 202b at a predetermined pressing force.

Note that one end of the compression coil spring 216 is attached to one connecting rod 208, and the other end is attached to the other connecting rod 210 through an attachment 218. The attachment 218 is threadably engaged with the corresponding connecting rod 210 to be movable forward/backward along the extending direction of the compression coil spring 216. When the attachment 218 is moved forward/backward, the pressing force of the compression coil spring 216 can be arbitrarily adjusted.

With the above arrangement, the second embodiment can achieve the desired object of the present invention.

(Description of One Modification of Second Embodiment)

In the second embodiment, the two pressing rollers 64 and 66 which are in contact with the inner circumferential surface of the rotating member are axially supported, through the pair of connecting rods 208 and 210, on the driving housing 44 for axially supporting the driving roller 60. However, the present invention is not limited to this, and the two pressing rollers may be arranged as shown in one modification of the second embodiment illustrated in FIGS. 22 and 23.

According to one modification, as shown in FIG. 22, the pressing rollers 64 and 66 are connected through a single connecting rod 220. The connecting rod 220 extends along a direction perpendicular to the direction indicated by the arrow X as a movable direction of the driving housing 44 in the second embodiment. The intermediate portion of the connecting rod 220 is guided by a pair of guide members 222a and 222b.

Figure 23:
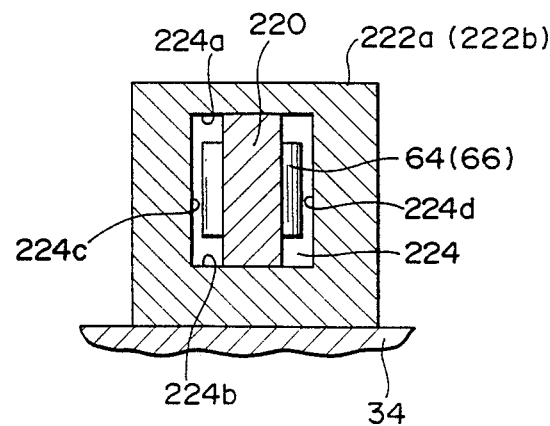
FIG. 23 is a sectional view showing an engaging relationship between a connecting arm and a guide member shown in FIG. 22.

These guide members 222a and 222b are fixed on the body 34a of the fixed supporting base 34, as shown in FIG. 23, and have through holes 224 through which the connecting rod 220 extends. Each through hole 224 has upper and lower surfaces 224a and 224b which are in sliding contact with the upper and lower surfaces of the connecting rod 220, and left and right inner side surfaces 224c and 224d which are separated from the left and right side surfaces of the connecting rod 220 by predetermined distances, respectively. In this manner, the connecting rod 220 is guided by these guide members 222a and 222b to be inhibited from being moved in the vertical direction and to be movable in the direction indicated by the arrow X.

In this modification, the pressing means comprises the compression coil spring 216, and the ends of the compression coil 216 are fixed to the driving housing 44 and the central portion (portion intersecting the predetermined diameter) of the connecting rod 220.

In this manner, the driving roller 60 is pressed against the inner race 202b integrally connected to the rotating member 38 at a predetermined pressing force. As a result, the same function and effect as in the second embodiment can be obtained.

(Description of Another Modification of Second Embodiment)

Figure 24:
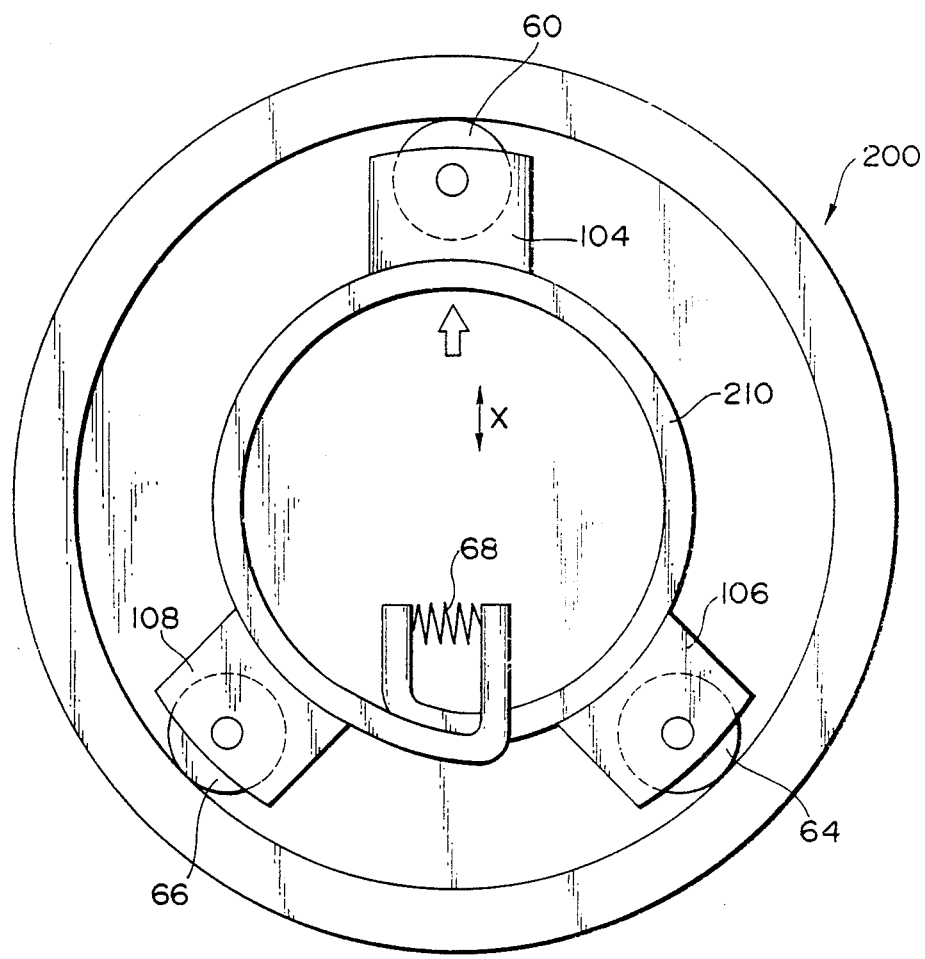
FIG. 24 is a top view showing an arrangement of another modification of the second embodiment.

In the second embodiment, the connecting means comprises the pair of connecting rods 208 and 210. However, the present invention is not limited to this. For example, the connecting means may be arranged as shown in another modification of the second embodiment illustrated in FIG. 24.

In another modification of the second embodiment, the connecting means is arranged in the same manner as the C-shaped connecting segment 210 described with reference to FIG. 16 in one modification, and the same spring mechanism 68 is employed. When this modification is arranged as described above, the same function and effect as in the second embodiment described above can be provided.

(Description of Third Embodiment)

In the first and second embodiments described above, the single spring mechanism 68 is arranged for the driving roller 60 and the two pressing rollers 64 and 66. The present invention is not limited to this arrangement. For example, an arrangement as shown in a third embodiment illustrated in FIGS. 25 to 27 may be employed.

Figure 25:
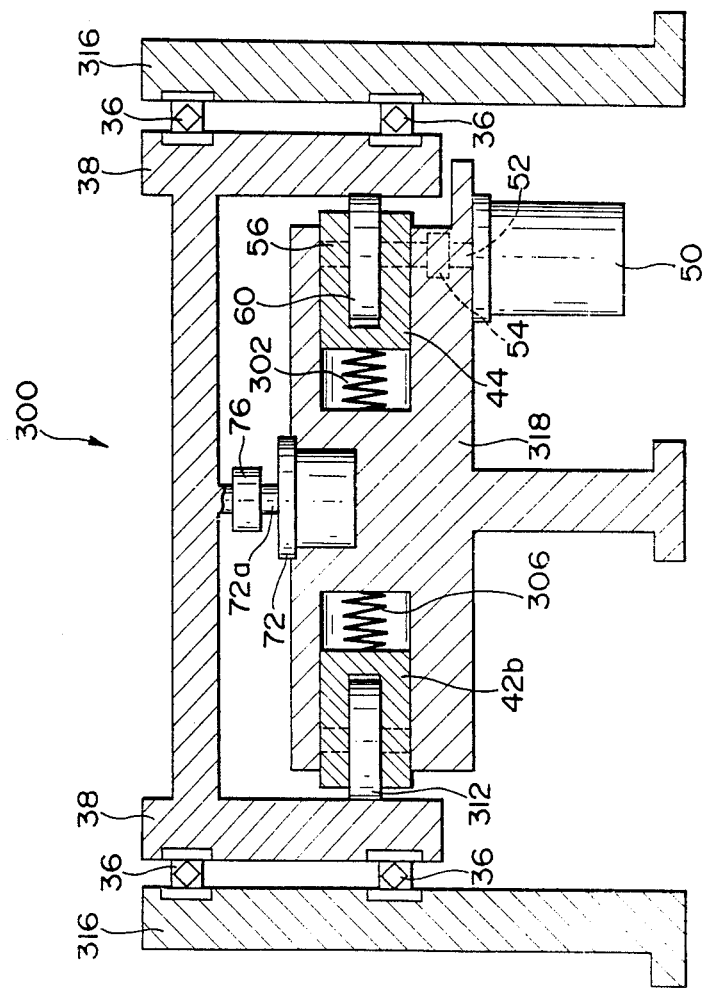
FIG. 25 is a longitudinal sectional view showing an arrangement of a third embodiment of a rotational driving apparatus with frictional engagement according to the present invention.

FIG. 25 shows a rotational driving apparatus 300 with frictional engagement according to the third embodiment. In the rotational driving apparatus 300, when the rotational force of the driving motor 50 is transmitted to the rotating member 38 through the driving roller 60, the driving roller 60 itself is biased by a coil spring 302 to be pressed against the rotating member 38. In addition, the driving force is transmitted to the rotating member through three pressing rollers 310, 312, and 314 biased by three coil springs 304, 306, and 308, respectively. The rotational force of the rotating member 38 rotated in this manner is externally derived. The rotating member 38 is rotatably supported by a fixed frame 316 located outside through the cross-roller bearing 36. More specifically, the rotating member 38 is freely rotatable with respect to the fixed frame 316 by the cross-roller bearing 36 so as not to be offset vertically.

An inner fixed frame 318 fixed coaxially with the outer fixed frame 316 is disposed inside the rotating member 38. A rotary encoder 72 is arranged on the upper portion of the inner fixed frame 318. Rotation of the rotating member 38 is detected by the encoder 72 through a coupling joint 76 and a detection terminal 72a of the encoder 72.

The above-mentioned four rollers (i.e., one driving roller 60 and the three pressing rollers 310, 312, and 314) are rotatably supported on the inner fixed frame 318 at equal angular positions, i.e., at 90° intervals, on a circumference coaxial with the rotational shaft of the rotating member 38. In other words, the driving roller 60 and the pressing roller 310 located at the side opposite thereto are pressed in opposing directions by the coils springs 302 and 304 against the inner circumferential surface of the rotating member 38. Similarly, the pressing rollers 312 and 314 separated at 90° intervals from the driving roller 60 and the pressing roller 310, respectively, are pressed in opposing directions by the coil springs 306 and 308 against the inner circumferential surface of the rotating member 38.

Figure 26:
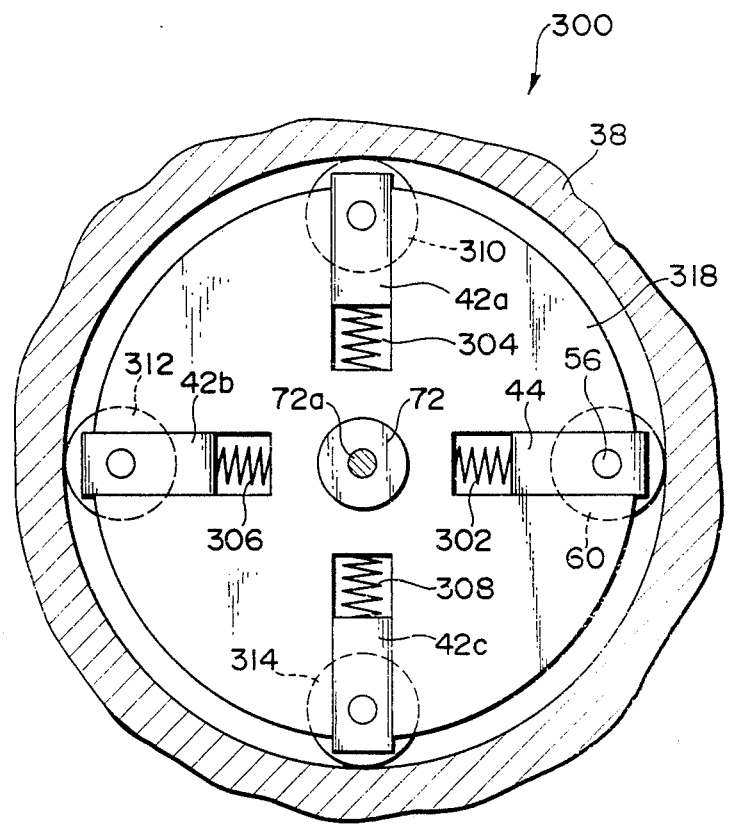
FIG. 26 is a plan view schematically showing the positional relationship between four frictional rollers and a spring of the rotational driving apparatus shown in FIG. 25.

More specifically, the driving housing 44 for rotatably supporting the driving shaft 56 of the driving roller 60, and pressing housings 42a, 42b, and 42c for rotatably supporting the rotating shafts of the three pressing rollers 310, 312, and 314 are mounted in a cavity defined in the fixed frame 318 to be slidable in the radial direction, as shown in FIG. 26. The driving housing 44 and the pressing housings 42a, 42b, and 42c are biased radially outwardly by the above-mentioned coil springs 304, 306, and 308, respectively. The driving roller 60 and the three pressing rollers 310, 312, and 314 are always pressed against the inner circumferential surface of the rotating member 38.

In the third embodiment, the driving shaft 56 of the driving roller 60 is coupled to the motor shaft 52 of the first driving motor 50 through the coupling joint 54 having a predetermined compliance as in the first embodiment. More specifically, when the first driving motor 50 is rotated, the driving roller 60 is rotated around the driving shaft 56. Then, since the rotating axis of the driving roller 60 is fixed, the rotating member 38 with which the driving roller 60 is in rolling contact is rotated around the inner fixed frame 318.

In this manner, when the rotating member 38 is rotated, the rotating member 38 can be rotated while being smoothly guided by the remaining frictional rollers 310, 312, and 314. As can be apparent from FIGS. 25 and 26, the rotating member 38 can be theoretically rotated by only the single driving roller 60. However, when the frictional rollers 310, 312, and 314 are arranged, first, the rotating member 38 can be smoothly rotated, second, the center of rotation of the rotating member 38 can be prevented from being offset, and third, an excessive load can be prevented from being applied to the encoder 72.

Figure 27:
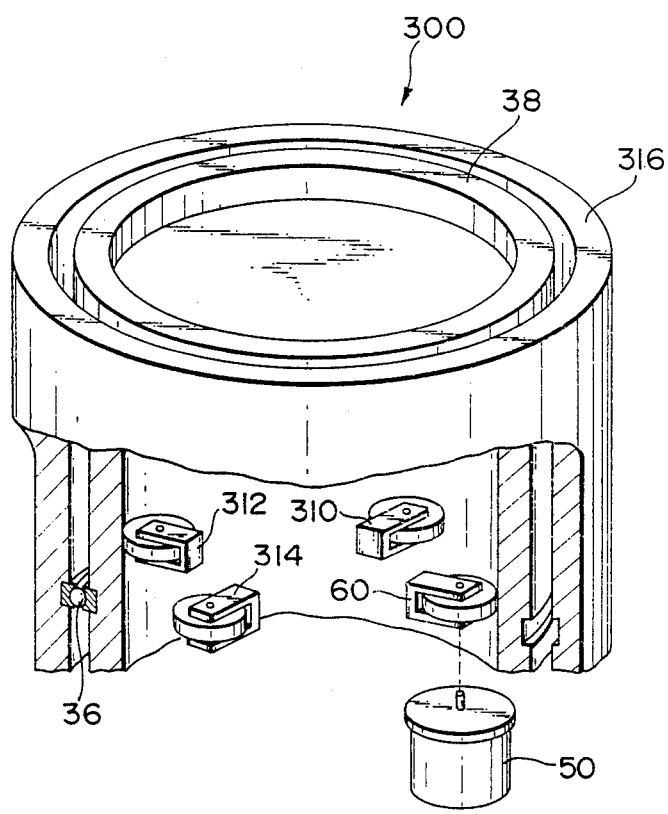
FIG. 27 is a perspective view schematically showing a rolling contact state between the four frictional rollers and a rotating member shown in FIG. 25.

FIG. 27 is a partially cutaway, perspective view of the rotational driving apparatus 300 shown in FIGS. 25 and 26. FIG. 27 clarifies the positional relationship among the four frictional rollers and the driving motor, and hence, other portions are omitted.

Note that the rotary encoder 72 is directly attached to the rotating member 38 to accurately detect an angular position. More specifically, when the driving roller 60 is pressed at a pressing force causing no slip, the driving roller 60 and the rotating member 38 are deformed, and a variation in precision may occur. However, as described above, since the rotary encoder 72 is directly coupled to the rotating member 38, the influence caused by deformation of the transmission system can be ignored. The influence caused by wear of the four frictional rollers 60, 310, 312, and 314 can be ignored since the position of the rotating member 38 is directly read and is fed back to the driving motor 50, thus allowing high-precision positioning without causing a decrease in precision.

(Applications of the Present Invention)

Figure 28:
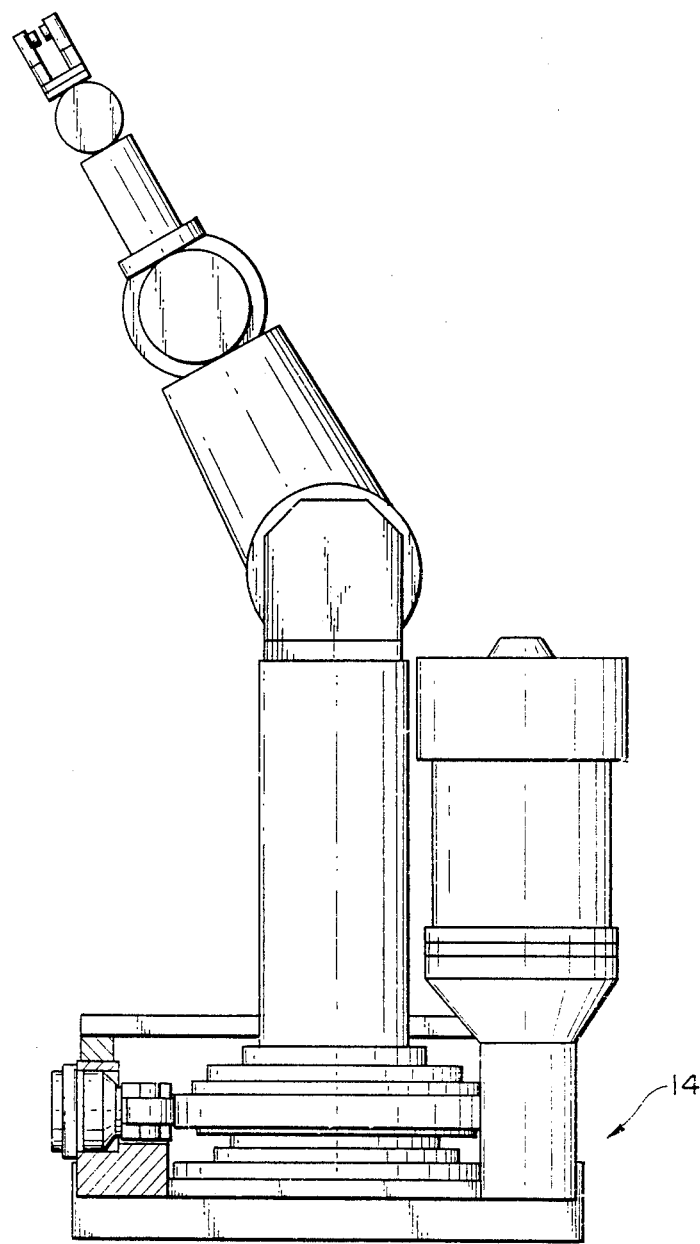
FIG. 28 is a front view schematically showing an arrangement of a revolute robot to which a rotational driving apparatus with frictional engagement according to the present invention is applied.

In each of the various embodiments described above, the rotating driving apparatus 10, 200, or 300 is applied to a horizontal scalar type articulated robot. However, a rotational driving apparatus with frictional engagement according to the present invention is not only applied to the scara robot but also to a revolute robot, as shown in FIG. 28, or to a cylindrical robot, as shown in FIG. 29.

In each of the various embodiments described above, the rotational driving apparatus is arranged between the base 12 and the upright shaft portion 16. However, the present invention is not limited to this arrangement. The apparatus may be disposed between the first and second arms.

Furthermore, in each of the various embodiments described above, three rollers (two pressing rollers and one driving roller) or four rollers (three pressing rollers and one driving roller) are arranged as frictional rollers. However, the present invention is not limited to the above number of frictional rollers. A desired object of the present invention can be achieved by arranging at least two frictional rollers.

What is claimed is:

1. A rotational driving apparatus for rotating a shaft which includes one end portion connected to a base and the other end portion connected to a load section, comprising:

a rotating member, having an axis, connectable to the rotating shaft and being rotatably supported on the base;

driving means for supplying a driving force to said rotating member, said driving means including a driving source, a driving roller being in rolling contact with said rotating member and transmitting the driving force from said driving source to said rotating member, and a driving housing for rotatably supporting said driving roller;

pressing means for pressing said driving roller and said rotating member against each other, said pressing means including at least one pressing roller being in rolling contact with said rotating member, a pressing member for supplying a pressing force to said pressing roller, and a pressing housing for rotatably supporting said pressing roller, with said driving housing and pressing housing being symmetrically arranged with respect to said rotating member such that the axis of said rotating member is centrally positioned between said driving and pressing rollers; and fixing means for spatially adjusting the driving housing and pressing housing with each other, said fixing means including a connecting member for firmly connecting said driving housing and pressing housing on the base, with said connecting member defining set positions of said driving housing and pressing housing on the base so as to maintain the pressing condition of said driving and pressing roller against said rotating member.

2. The apparatus according to claim 1, which further comprises:

a first housing for holding said driving roller to be pressed against the inner circumferential surface of said rotating member; and roller holding means for holding said frictional roller to be in contact with the inner circumferential surface of said rotating member, and wherein said pressing means has a spring member, and said spring member applies a biasing force for pressing said driving and frictional rollers against said rotating member between said first housing and said roller holding means.

3. The apparatus according to claim 2, wherein two frictional rollers are arranged, said roller holding means comprises first and second roller holding members rotatably and axially supporting said frictional rollers, respectively, said first and second roller holding members are coupled to said first housing at one ends thereof by hinges, and said spring member is interposed between said first and second roller holding members.

4. The apparatus according to claim 2, wherein two frictional rollers are arranged, said roller holding means comprises a single roller holding member rotatably and axially supporting said frictional rollers at two ends thereof, and said spring member is interposed between said roller holding member and said first housing.

5. The apparatus according to claim 1, wherein said rotating member is formed to be hollow, and said pressing means includes:

a roller holding member for holding said frictional roller and said driving roller; and a pressing member for pressing said rollers against the inner circumferential surface of said rotating member, said roller holding member and said pressing member being hold by a fixed member arranged on the inner circumferential surface of said rotating member.

6. The rotational driving apparatus according to claim 1, further comprising detecting means for detecting the rotating amount of said rotating member, and further wherein the shaft member is a hollow shaft which holds an arm of a robot, and said detecting means is disposed in the hollow shaft.

7. The rotational driving apparatus according to claim 6, wherein said detecting means includes an encoder with a detecting end coupled to the base.

8. The rotational driving apparatus according to claim 7, wherein said driving roller has a face which opposes said rotating member and is outwardly expanded at a central portion thereof.

9. A rotational driving apparatus comprising:

a base;

a rotating member rotatable on said base;

driving means for supplying a driving force to said rotating member, said driving means including a driving source, a driving roller being in rolling contact with said rotating member and transmitting the driving force from said driving source to said rotating member, and a driving housing for rotatably supporting said driving roller, with said driving housing being slidable with respect to said base;

pressing means for pressing said driving roller and said rotating member against each other, said pressing means including at least one pressing roller being in rolling contact with said rotating member and a pressing member for supplying a pressing force to said pressing roller, and a pressing housing for rotatably supporting said pressing roller, with said pressing housing being slidable with respect to said base, wherein said driving housing and said pressing housing are symmetrically arranged with respect to said rotating member such that a rotating axis of said rotating member is centrally disposed between said driving and pressing rollers; and a connecting member for maintaining a constant distance between said driving housing and said pressing housing.

* * * * *

UNITED STATES PATENT AND TRADEMARK OFFICE
CERTIFICATE OF CORRECTION

PATENT NO. : 4,951,517

DATED : August 28, 1990

INVENTOR(S) : Yusaku Azuma, et al.

It is certified that error appears in the above-identified patent and that said Letters Patent is hereby corrected as shown below:

On title page, item

[56] REFERENCES CITED:

U.S. PATENT DOCUMENTS, "4,630,496 12/1986 Hirotoshi" should read --4,630,496 12/1986 Yasuoka--.

COLUMN 19:

Line 15, "one ends" should read --one end--.

Line 35, "being hold" should read --being held--.

Signed and Sealed this

Thirtieth Day of March, 1993

*Attest:*

STEPHEN G. KUNIN

*Attesting Officer*   *Acting Commissioner of Patents and Trademarks*